(12) United States Patent
Kim et al.

(10) Patent No.: US 7,568,895 B2
(45) Date of Patent: Aug. 4, 2009

(54) DUAL CAPACITY COMPRESSOR

(75) Inventors: Jong Bong Kim, Changwon-si (KR); Hee Hyun Kim, Busan-si (KR); Young Ju Bae, Changwon-si (KR); Chul Gi Roh, Changwon-si (KR)

(73) Assignee: LG Electronics Inc., Seoul (KR)

( * ) Notice: Subject to any disclaimer, the term of this patent is extended or adjusted under 35 U.S.C. 154(b) by 480 days.

(21) Appl. No.: 10/568,621

(22) PCT Filed: Dec. 23, 2003

(86) PCT No.: PCT/KR03/02821

§ 371 (c)(1), (2), (4) Date: Feb. 16, 2006

(87) PCT Pub. No.: WO05/061895

PCT Pub. Date: Jul. 7, 2003

(65) Prior Publication Data

US 2006/0285980 A1    Dec. 21, 2006

(30) Foreign Application Priority Data

Dec. 20, 2003   (KR) .................. 10-2003-0094245
Dec. 20, 2003   (KR) .................. 10-2003-0094246
Dec. 20, 2003   (KR) .................. 10-2003-0094247

(51) Int. Cl.
*F04B 1/06*  (2006.01)
(52) U.S. Cl. .................................................. 417/221
(58) Field of Classification Search ........... 92/60, 92/13, 13.4, 13.7, 140, 13.3; 417/92, 221, 417/315

See application file for complete search history.

(56) References Cited

U.S. PATENT DOCUMENTS 3,416,177 A * 12/1968 Young .............................. 15/98
3,873,446 A *  3/1975 Campbell ...................... 210/85
4,494,447 A *  1/1985 Sisk ............................ 92/13.3
4,808,084 A     2/1989 Tsubouchi et al. .......... 417/563

(Continued)

FOREIGN PATENT DOCUMENTS

WO    WO 02/097271 A1   12/2002

(Continued)

OTHER PUBLICATIONS

Chinese Office Action dated Mar. 7, 2008.

*Primary Examiner*—Devon C Kramer
*Assistant Examiner*—Todd D Jacobs
(74) *Attorney, Agent, or Firm*—KED & Associates, LLP

(57) ABSTRACT

A dual capacity compressor that prevents relative movement from taking place between certain components is provided. The dual capacity compressor includes a power generating part having a reversible motor and a crank shaft inserted in the motor, and a compression part having a cylinder, a piston and a connecting rod. A crank pin is provided in an upper part of the crank shaft, eccentric from an axis of the crank shaft, and an eccentric sleeve is rotatably fitted between the crank pin and an end of the connecting rod. A key member is held at least a part of the eccentric sleeve, and held at a particular portion of at the eccentric sleeve during operation so as to positively latch the eccentric sleeve with the crank pin in both directions rotation of the motor.

42 Claims, 27 Drawing Sheets

U.S. PATENT DOCUMENTS

| | | | |
|---|---|---|---|
| 5,024,167 A * | 6/1991 | Hayward | 108/50.02 |
| 5,725,593 A * | 3/1998 | Caracciolo | 623/22.23 |
| 5,906,047 A * | 5/1999 | Miller et al. | 28/890.132 |
| 6,132,177 A * | 10/2000 | Loprete et al. | 417/221 |
| 6,755,624 B2 * | 6/2004 | Bae et al. | 417/221 |
| 7,146,903 B2 * | 12/2006 | Choi et al. | 92/13 |

FOREIGN PATENT DOCUMENTS

WO     WO 03/052271 A1     6/2003

\* cited by examiner

DUAL CAPACITY COMPRESSOR

TECHNICAL FIELD

The present invention relates to compressors for compressing working fluid, such as refrigerant, to a required pressure, and more particularly, to a compressor of which compression capacity changes with a direction of rotation.

BACKGROUND ART

The dual capacity compressor is a kind of reciprocating type compressor of which piston stroke and compression capacity are made to change with rotation directions of a motor and a crankshaft by means of an eccentric sleeve rotatably coupled with a crank pin of a crankshaft. Since the dual capacity compressor has a compression capacity that can be changed depending on a required load, the dual compressor is used widely in apparatuses which require compression of working fluid, particularly in home appliances operative in a refrigeration cycle, such as a refrigerator, for enhancing an operation efficiency.

A U.S. Pat. No. 4,236,874 discloses a general dual capacity compressor, referring to which a related art dual capacity compressor will be described, briefly.

FIG. 1 illustrates a section of a dual capacity compressor disclosed in the U.S. Pat. No. 4,236,874, and FIG. 2 illustrates operation of the dual capacity compressor, schematically.

Referring to FIG. 1, the dual capacity compressor is provided with a piston 7 in a cylinder 8, a crankshaft 1, a crank pin 3 having an axis 3a eccentric from an axis 1a of the crankshaft 1, an eccentric ring 4 coupled with the crank pin 3, and a connecting rod 6 connected between the eccentric ring 4 and the piston 7, as key components. The eccentric ring 4 and the connecting rod 6 are rotatable with respect to each other, as well as the axis 3a of the crank pin. There are release areas 9 in contact surfaces of the crank pin 3 and the eccentric ring 4 respectively, and a key 5 for coupling the crank pin 3 with the eccentric ring 4 in the release areas. The operation of the dual capacity compressor with respect to the compression capacity will be described. As shown in FIG. 2, in the dual capacity compressor, a stroke of the piston 7 is regulated by an eccentricity varied with a position of the eccentric ring 4, wherein, if a large capacity is required, the crank shaft 1 is rotated in a clockwise direction (regular direction) and, if a small capacity is required, the crank shaft 1 is rotated in a counter clockwise direction (reverse direction). In detail, FIG. 2A illustrates a moment the piston 7 is at a top dead center during a clockwise direction rotation, and FIG. 2B illustrates a moment the piston 7 is at a bottom dead center during a clockwise direction rotation, when the strokes Lmax are the greatest because the eccentricity are the greatest. FIG. 2C illustrates a moment the piston 7 is at a bottom dead center during a counter clockwise direction rotation, and FIG. 2D illustrates a moment the piston 7 is at a top dead center during a counter clockwise direction rotation, when the strokes Lmin are the smallest because the eccentricity are the smallest.

However, during the foregoing operation, there are centrifugal forces acting on the crank pin 3 and the eccentric ring 4 perpendicular to the shaft axis 1a and the pin axis 3a respectively, along planes containing both the shaft axis 1a and the pin axis 3a, and both the shaft axis 1a and a center 4a of gravity of the ring respectively, caused by their rotation round the axis 1a of the crank shaft. Therefore, different from FIGS. 2A and 2B, in cases of FIGS. 2C and 2D, as lines of actions are not on the same line, a local rotating moment is taken place at the eccentric ring 4 with respect to the pin 3 as a product of a vertical distance 'd' to the pin 3 and its own centrifugal force, acting in a direction the same with a direction (counter clockwise direction) of rotation of the crank shaft 1. Since the crank pin 3 and the eccentric ring 4 are members that can make relative motion to each other, the rotating moment causes a relative rotation of the eccentric ring 4 in a direction of rotation of the crank shaft 1, disengaging the key 5 both from the crank pin 3 and the eccentric ring 4, and leaving the eccentric ring 4 and the key 5 to move in the rotation direction as shown in dashed lines in FIG. 3. Moreover, as shown in FIG. 3, for an example, during clockwise direction operation, a pressure 'P' (a pressure of re-expansion of the working fluid) in the cylinder after compression pushes the eccentric ring 4 to a direction of rotation of the crank shaft 1, to cause the eccentric ring 4 to make a relative rotation with respect to the crank pin 3 in a rotation direction of the crank shaft. At the end, such a relative rotation makes operation of the compressor unstable, to fail to obtain a desired compression performance.

In fact, the relative rotation is occurred because the key 5 fails to latch both the crank pin 3 and the eccentric ring, perfectly. The key 5 rolls within the release area whenever the direction of rotation of the crank shaft is changed, to result in serious wear at respective contact surfaces, that shortens a lifetime of the compressor.

In the meantime, other than the U.S. Pat. No. 4,236,874, there are many patent publications that disclose technologies of the dual capacity compressors, which will be described, briefly.

Similarly, U.S. Pat. No. 4,479,419 discloses a dual capacity compressor provided with a crank pin, eccentric cam and a key. The key is fixed to the eccentric cam, and moves along a track in a crank pin when a direction of rotation of the compressor is changed. However, since the key can not latch both the crank pin and the eccentric cam, perfectly, the U.S. Pat. No. 4,479,419 also has unstable operation caused by the relative rotation.

U.S. Pat. No. 5,951,261 discloses a compressor having an eccentric part with a diameter of bore, formed across the eccentric part, and an eccentric cam with another bore with a diameter the same with the eccentric part, formed at one side thereof. A pin is provided to the bore in the eccentric part, and a compression spring is provided to the bore in the eccentric sleeve. Accordingly, when the bores are aligned during rotation, the pin moves into the bore in the cam by a centrifugal force, that couple the eccentric part and the eccentric cam, together. However, since the U.S. Pat. No. 5,951,261 is provided with only one bore in the eccentric cam, the U.S. Pat. No. 5,951,261 can couple the eccentric part and the eccentric cam together only when the compressor rotates in a particular direction. Moreover, an operation reliability can not be secured, since an exact movement of the pin from the eccentric part to the cam through respective bores is difficult.

DISCLOSURE OF INVENTION

An object of the present invention is to provide a dual capacity compressor which can maintain a constant eccentricity and make a stable operation even if the compressor is rotated in any directions that have different compression capacities.

As described, the inventor understands that the unstable operation of the dual capacity compressor is caused by a local centrifugal force of the eccentric sleeve, and an external load through the connecting rod and etc., during operation. Though such causes are not avoidable as far as an eccentric mechanism is used, the inventor understand that, if the crank pin and the eccentric sleeve can be held positively during operation, such a problem can be solved. Taking an idea of a key member that has such a holding structure, the key member and members related thereto are modified to prevent the relative rotation between the crank pin and the eccentric sleeve.

According to this, the present invention provides a dual capacity compressor including a power generating part having a reversible motor and a crank shaft inserted in the motor, a compression part having a cylinder, a piston in the cylinder, and a connecting rod connected to the piston, a crank pin in an upper part of the crank shaft eccentric from an axis of the crank shaft, an eccentric sleeve having an inside circumferential surface rotatably fitted to an outside circumferential surface of the crank pin, and an outside circumferential surface rotatably fitted to an end of the connecting rod, a key member configured such that the key member is held at least a part of the eccentric sleeve, and held at the eccentric sleeve additionally during operation, for latching the eccentric sleeve with the crank pin positively in all rotation directions of the motor.

The key member is continuously held at least a part of the eccentric sleeve relatively positioned on a radial direction inner side of the crank shaft. In more detail, the key member includes a first projection for continuous projection beyond the crank pin by a predetermined length, and a second projection for projection beyond the crank pin by a predetermined length only during operation.

The key member prevents rotation of the eccentric sleeve coming from a centrifugal force, and a consequential rotational moment. For this, the key member is continuously held at least a part of the eccentric sleeve so that a rotational moment is generated at the eccentric sleeve in a direction opposite to the rotation direction of the crank shaft. In more detail, the key member includes a first projection for continuous projection beyond the crank pin, and a second projection for continuous projection beyond the crank pin, and being held at the eccentric sleeve during operation of the compressor.

Moreover, the key member further includes an elastic member for supporting the key member to project at least a part of the key member beyond the crank pin continuously regardless of a state of operation of the compressor. Preferably, the elastic member limits movement of the key member in one direction. The elastic member has a non-uniform elastic force. The elastic member includes a first elastic member in contact with the key member, and a second elastic member in contact with the first elastic member and the inside circumferential surface of the crank pin respectively, having an elastic force greater than the first elastic member.

The eccentric sleeve further includes a balance weight for preventing breaking away of the eccentric sleeve from the key member due to rotation before the key member latches the eccentric sleeve perfectly by shifting a center of gravity of the eccentric sleeve. The balance weight positions the center of gravity of the eccentric sleeve on a plane containing both a longitudinal axis of the crank shaft and a longitudinal axis of the crank pin. The balance weight shifts the center of gravity of the eccentric sleeve to position opposite with respect to a plane containing both a longitudinal axis of the crank shaft and a longitudinal axis of the crank pin.

Thus, the present invention prevents relative rotation from taking place between the crank pin and the eccentric sleeve, to permit stable operation and efficiency improvement of the compressor.

BRIEF DESCRIPTION OF DRAWINGS

The accompanying drawings, which are included to provide a further understanding of the invention, illustrate embodiments of the invention and together with the description serve to explain the principles of the invention.

In the drawings.

BEST MODE FOR CARRYING OUT THE INVENTION

Figure 1:
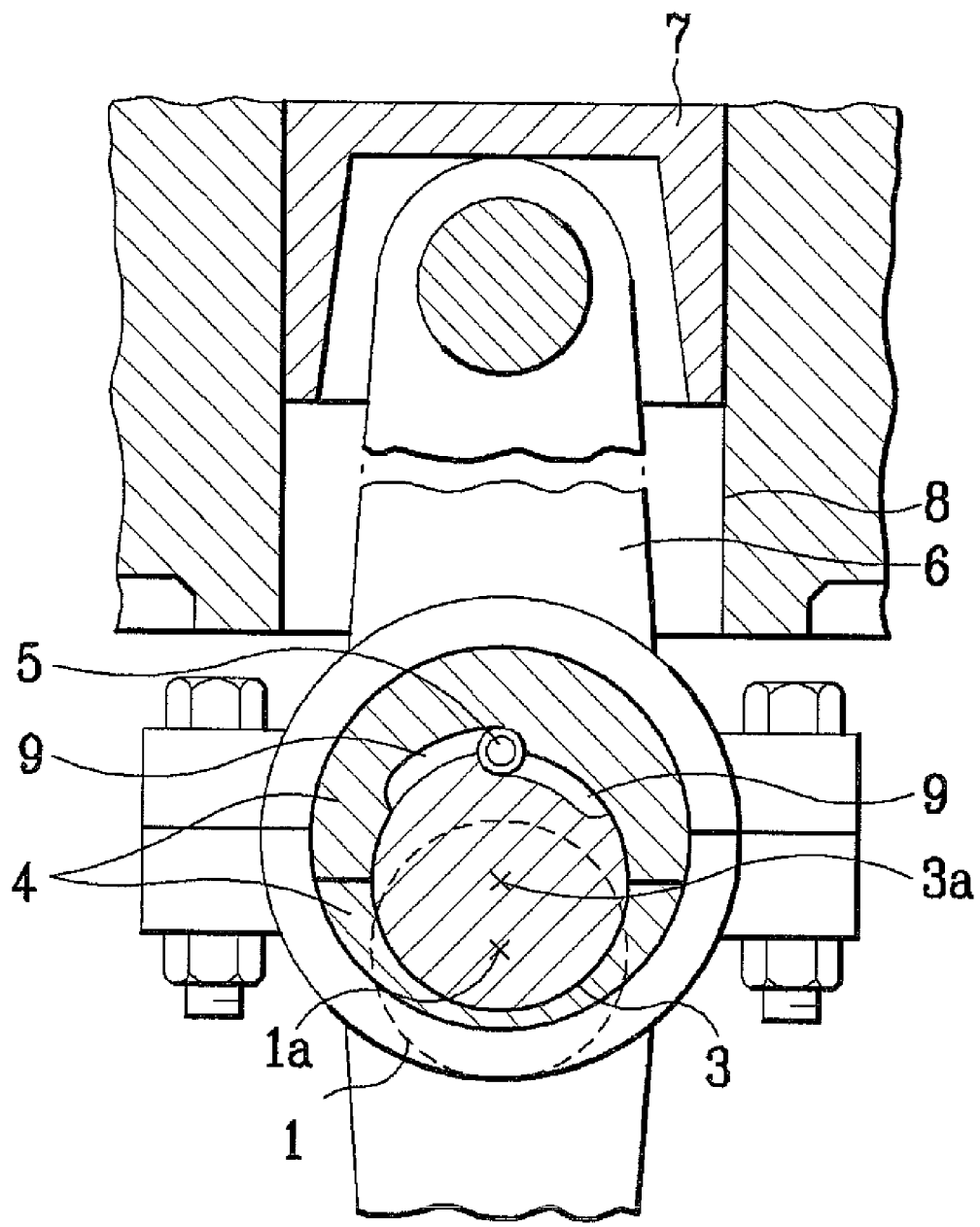
FIG. 1 illustrates a section of a related art dual capacity compressor.
Figure 2:
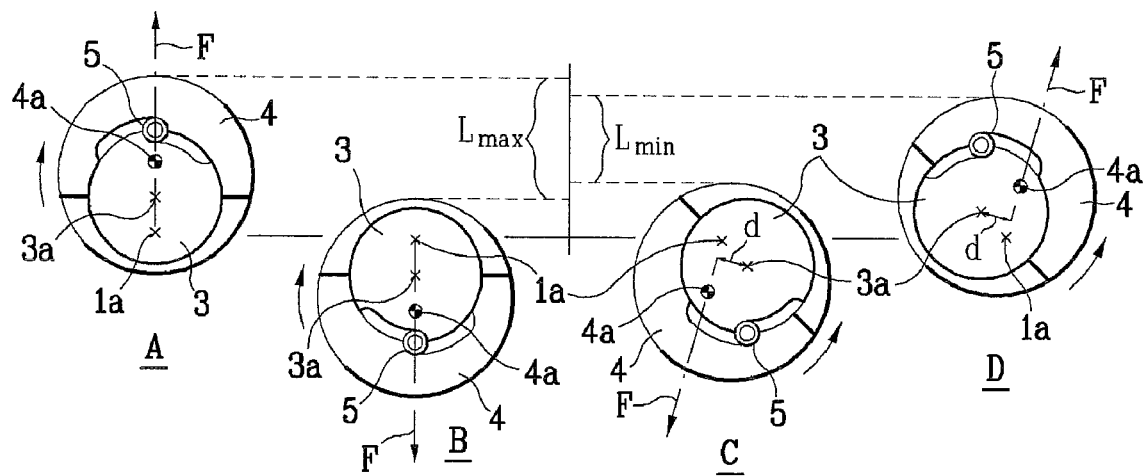
FIG. 2 illustrates the operation of the related art dual capacity compressor in FIG. 1, schematically.
Figure 3:
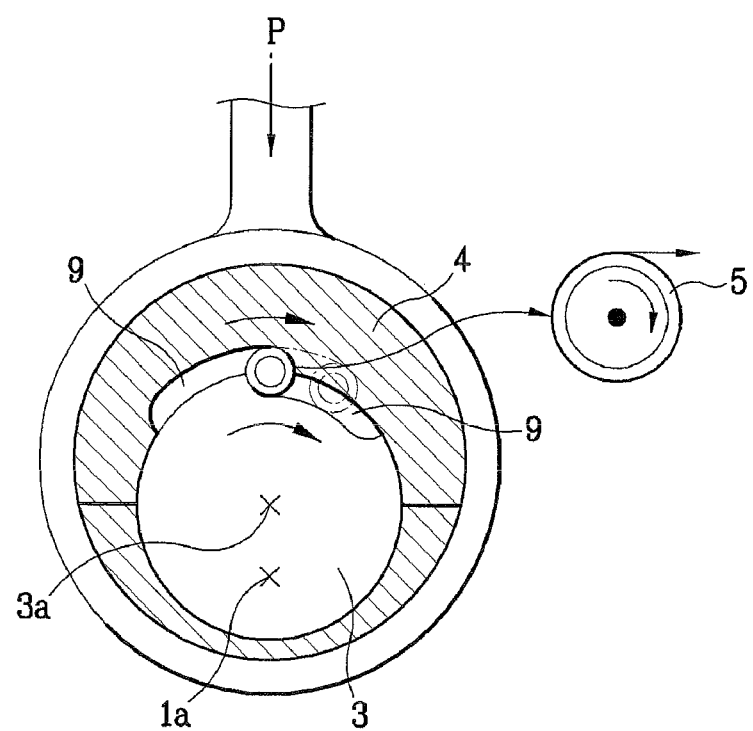
FIG. 3 illustrates a section of key parts of a related art dual capacity compressor showing relative rotation between the crank pin and the eccentric sleeve, schematically.
Figure 4:
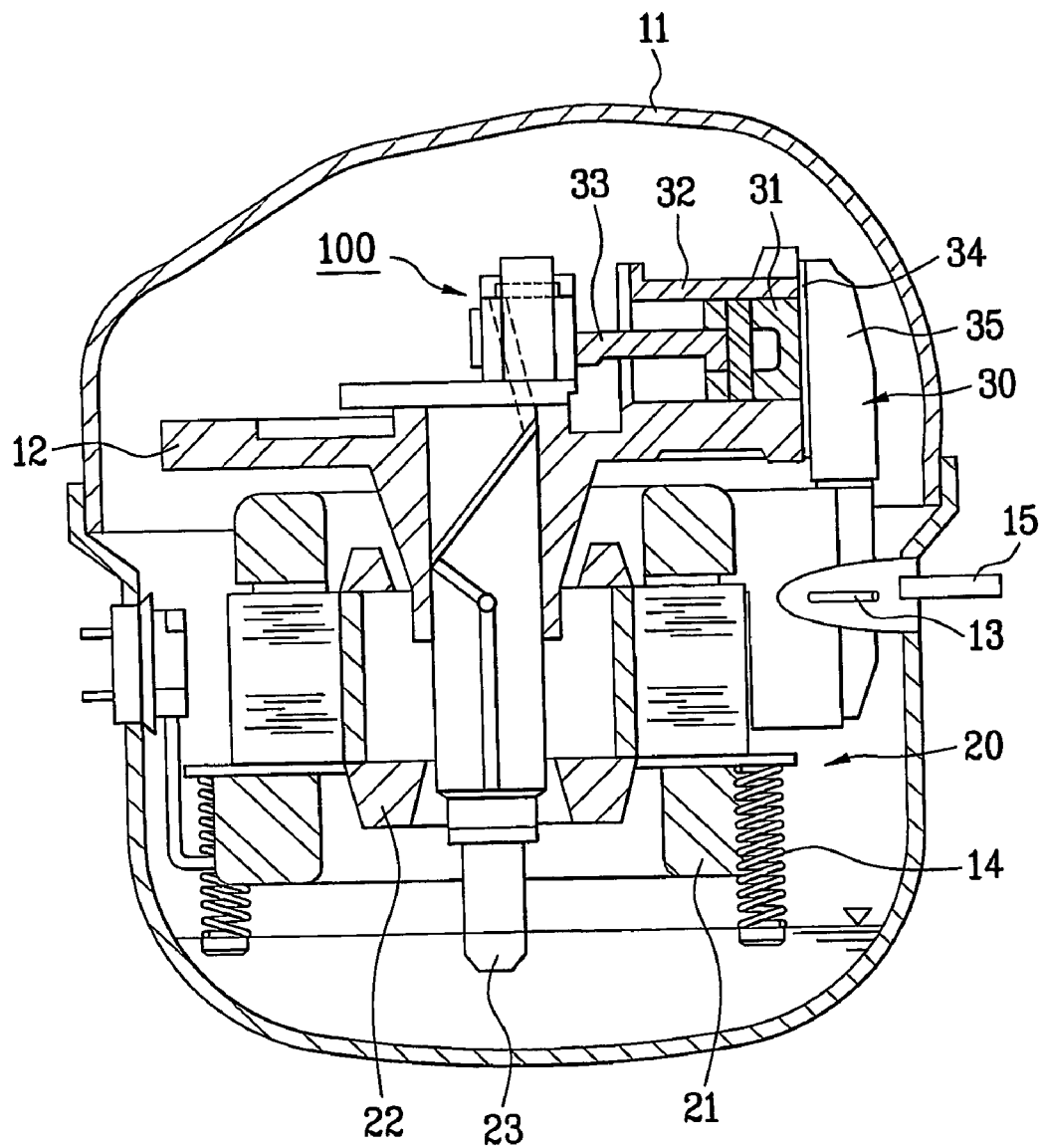
FIG. 4 illustrates a section of a dual capacity compressor in accordance with a preferred embodiment of the present invention.

Reference will now be made in detail to the preferred embodiments of the present invention, examples of which are illustrated in the accompanying drawings. In describing embodiments of the present invention, same parts will be given the same names and reference symbols, and repetitive descriptions of which will be omitted. An overall structure of the dual capacity compressor of the present invention will be described, with reference to FIG. 1 As shown, the dual capacity compressor of the present invention includes a power generating part 20 in a lower portion of the compressor for generating and transmitting a required power, and a compression part 30 over the power generating part 20 for compressing working fluid by using the power. Moreover, in addition to these general parts, the dual capacity compressor includes a stroke changing part 100 connected between the power generating part 20 and the compression part 30 for varying a compression capacity of the compression part 30 during operation. In the meantime, there is a shell 11 which encloses the power generating part 20 and the compression part 30 for preventing refrigerant from leaking, and there is a frame 12 elastically supported on a plurality of supporting members 14 (i.e., springs) attached to an inside of the shell 11. There are a refrigerant inlet 13 and a refrigerant outlet 15 fitted to, and in communication with an inside of the shell 11.

The power generating part 20 under the frame 12 includes a motor with a stator 21 and rotor 22 for generating a rotating force by an external electrical power, and a crank shaft 23. The motor is reversible. The crank shaft 23 has a lower part inserted in the rotor 22 for transmission of a power, and oil holes or grooves for supplying lubrication oil held in the lower part to driving parts.

The compression part 30 is mounted on the frame 12 over the power generating part 20, and includes a mechanical driving part for compression of the refrigerant, and a suction and discharge valves for assisting the driving part. In addition to a cylinder 32 that actually forms a compression space, the driving part has a piston 31 for reciprocating in the cylinder 32, and a connecting rod 33 for transmission of reciprocating power to the piston 31. The valves receive and discharge refrigerant to/from the cylinder 32 in association with a cylinder head 34 and the head cover 35.

The stroke changing part 100 of the dual capacity compressor of the present invention will be described in detail, while description of the power generating part and the compression part, which are identical to the related art, are omitted.

Figure 5A:
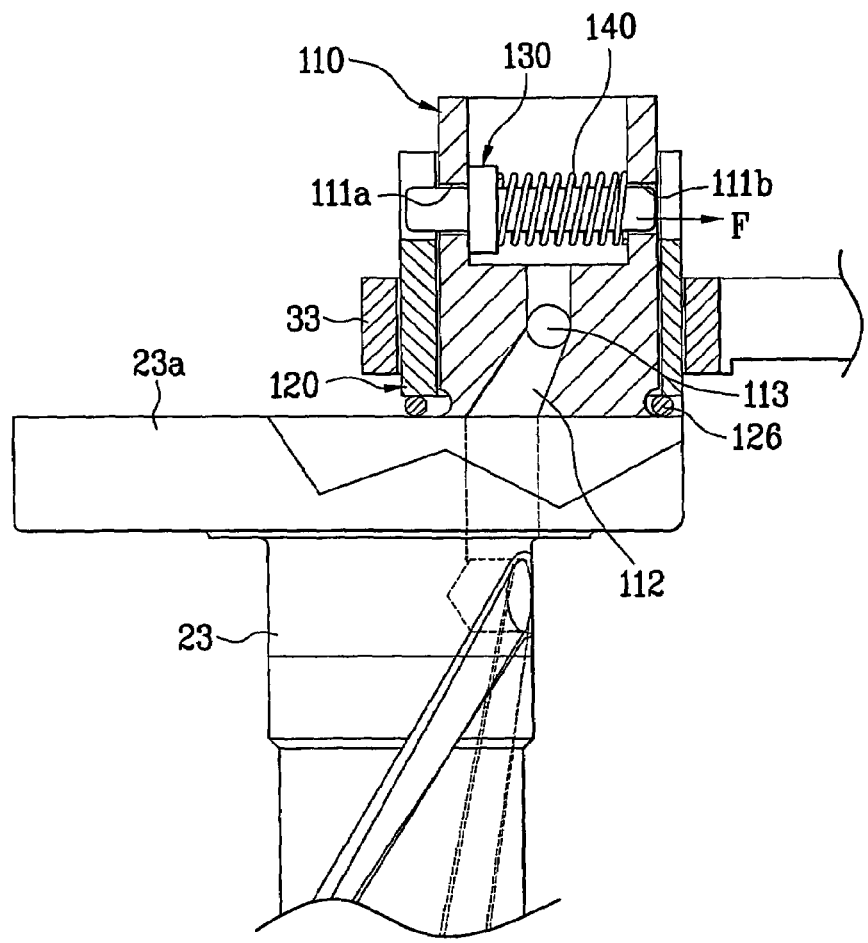
FIG. 5A illustrates a side view with a partial section of a dual capacity compressor in accordance with a first preferred embodiment of the present invention.

Referring to FIG. 5A, on the whole, the stroke changing part 100 includes a crank pin 110 on top of, and in eccentric from, the crank shaft, an eccentric sleeve 120 rotatably fitted between an outside circumferential surface of the crank pin 110 and the connecting rod 33, and a key member 130 fitted in the crank pin 110. The key member 130 holds the positions of the crank pin 110 and the eccentric sleeve 120 with respect to each other during operation of the compressor. In the stroke changing part 100, the eccentric sleeve 120 is rotatably arranged between the connecting rod 33 and the crank pin 110, such that an effective eccentricity thereof changes with rotation directions (regular or reverse direction) of the motor. For maintaining such a changed effective eccentricity, the key member 130 latches the eccentric sleeve 120. Therefore, in the stroke changing part 100, when the rotation direction of the motor is changed, a stroke length of the connecting rod and a displacement of the piston change with change of the effective eccentricity, and thus the compression capacity also changes depending on the rotation direction. The stroke changing part 100 of the present invention described briefly will be described in more detail, with reference to the attached drawings.

Figure 5B:
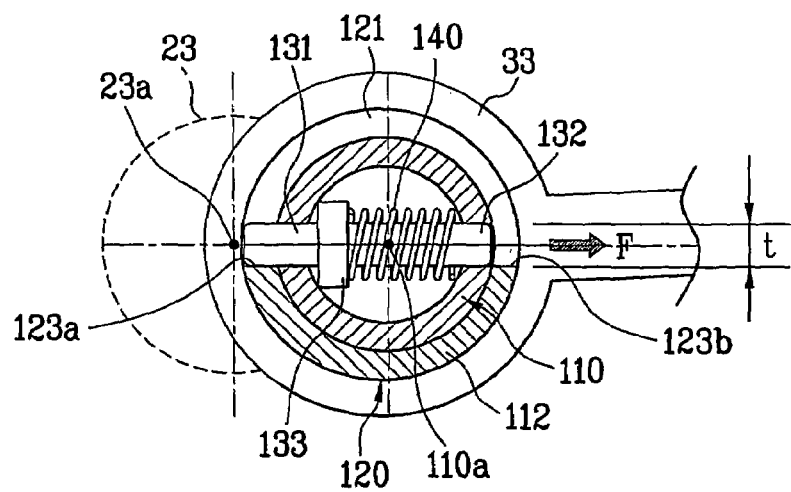
FIG. 5B illustrates a plan view with a partial section of a dual capacity compressor in accordance with a first preferred embodiment of the present invention.

FIGS. 5A and 5B illustrate side and sections of dual capacity compressors of the present invention respectively, wherein components thereof are shown in assembled states with partial sections for easy description and clarity. FIGS. 6A~12 illustrate the components, individually.

Referring to FIG. 5A, the crank pin 110 is hollow partially, for movably fitting the key member 130 in the hollow. The crank pin 110 also has one pair of key member fitting parts 111 formed opposite to each other, and an oil passage 112 and an oil supply hole 113 in a low part.

Figure 6A:
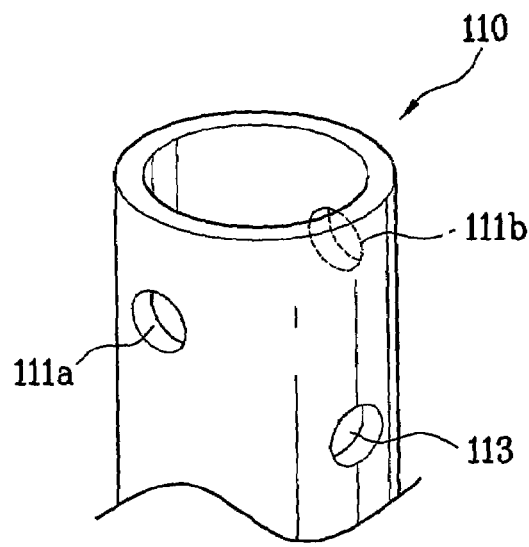
FIG. 6A illustrates a perspective view of a crank pin in accordance with a first preferred embodiment of the present invention.
Figure 6B:
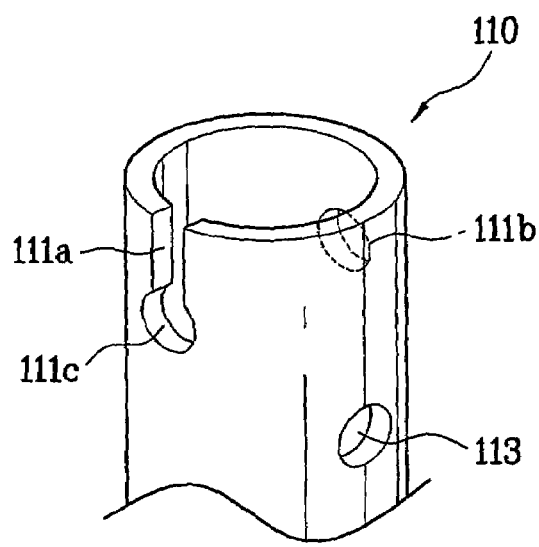
FIG. 6B illustrates a perspective view of a crank pin modified from one in FIG. 6A.

Referring to FIGS. 5A and 5B, the fitting parts 111a and 111b are formed in the hollow tube part so as to be disposed in a vertical plane containing both the crank shaft axis 23a and the crank pin axis 110a. Accordingly, the key member 130 in the fitting parts 111a and 111b is influenced from a centrifugal force F acting in a length direction of the key member 130 along a plane containing both the axes 23a and 110a. The key member 130 is movable by the centrifugal force F guided by the fitting parts 111a and 111b. As shown in FIG. 6A, the fitting parts 111a and 111b may actually form a pass through hole. The fitting parts 111 of the pass through hole can prevent the key member 130 from falling off during operation. Preferably, as shown in FIG. 6B, at least one of the fitting parts 111a and 111b may be a slot extended from a top end of a wall of the crank pin 110 to a position, for easy fitting of the key member 130 to the crank pin 110. It is more preferable that there is a seat part 111c at an end of the fitting part for stable fitting of the key member 130.

Referring to FIG. 5A, the oil passage 112 is in communication both with the oil groove in outside surface of the crank shaft 23, and the oil supply hole 113. The oil supply hole 113 is formed perpendicular to an extension line connecting the fitting parts 111a and 111b. The lubrication oil on the bottom of the compressor is at first passed through the oil groove and the oil passage 112, and sprayed so as to be supplied between contact surfaces of the components during operation for prevention of wear and smooth operation of the components, and may be supplied to a gap between the crank pin 110 and the eccentric sleeve 120 directly through the oil supply hole 113. Preferably, the crank pin 110 is formed higher than the eccentric sleeve 120, for spraying the lubrication oil to the components evenly from a high position.

The eccentric sleeve 120 basically has an inside circumferential surface rotatably coupled to an outside circumferential surface of the crank pin 110, and an outside circumferential surface rotatably coupled to an end of the connecting rod 33. In more detail, as shown in 7A, the eccentric sleeve 120 includes a track part 121 formed along a circumference thereof, and a limiting part 122 for limiting a track of the track part 121. There are two steps 123a and 123b between the track part 121 and the limiting part 122. As shown in FIG. 5A, since at least a part of the key member 130 is projected so as to be engaged with the eccentric sleeve 120 when the compressor is not in operation, the track part 121 makes such a rotation of the eccentric sleeve 120 itself relative to the key member possible. That is, the eccentric sleeve 120 can rotate round the crank pin 110 as much as a range the track part 120 is formed therein. Opposite to the track part 121, the limiting part 122 limits rotation of the sleeve itself together with the key member 130 during stoppage and movement. Actually, the key member 130 is caught at the steps 123a and 123b.

Figure 7A:
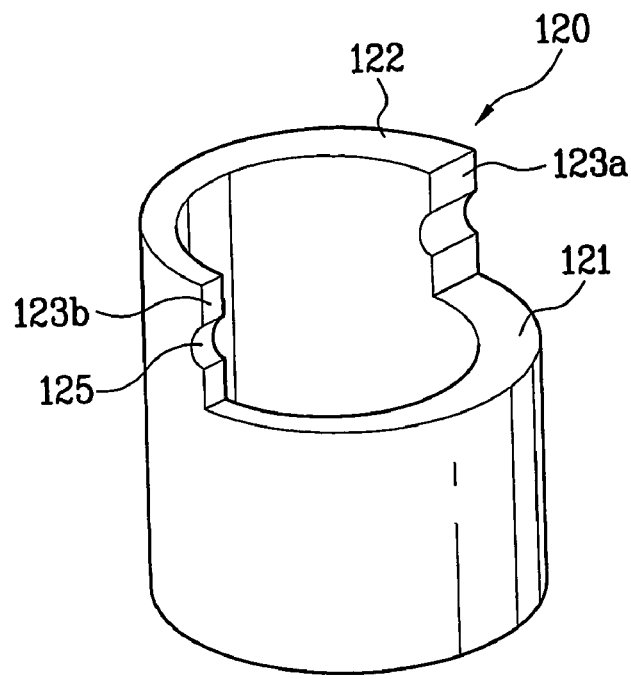
FIG. 7A illustrates a perspective view of an eccentric sleeve of the present invention.
Figure 7B:
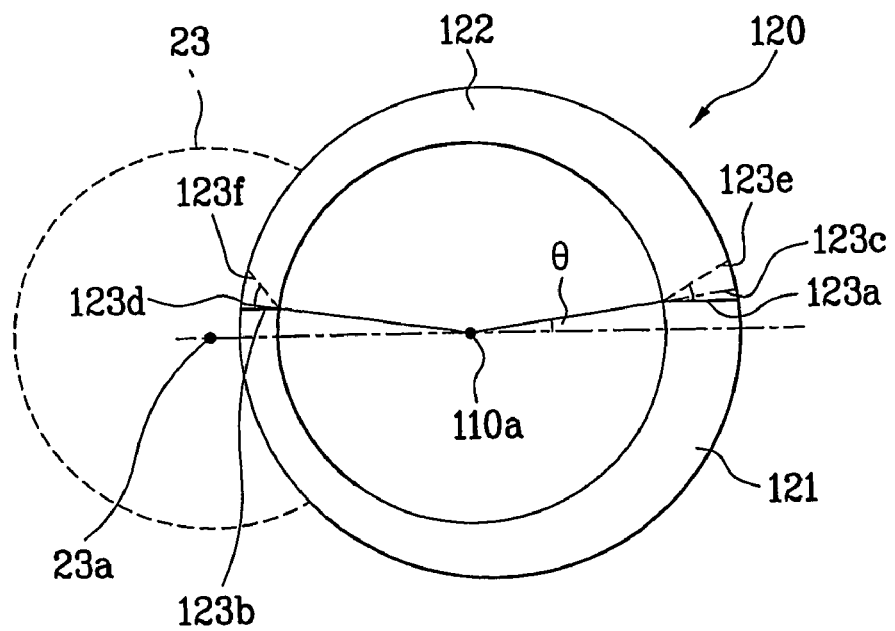
FIGS. 7B, 7C, and 7D illustrate a plan view, a side view, and a perspective view of variations of eccentric sleeves of the present invention, respectively.

In the eccentric sleeve 120, the track part 121 may be a cut away part starting from a top end of the eccentric sleeve 120 to a required depth extended along a circumferential direction, actually. As shown in FIGS. 5B and 7B, the steps 123a and 123b are formed in parallel to a plane containing both the crank shaft axis 23a and the crank pin axis 110a. That is, the steps 123a and 123b are formed parallel to an extension line between a maximum thickness and a minimum thickness of the eccentric sleeve to have different widths, and the extension line is on the plane containing both the axes 23a and 110a during operation of the compressor. In other words, the steps 123a and 123b are positioned on a plane parallel to a containing both the axes 23a and 110a at the same time. Consequently, the key member 130 disposed on the same plane can be caught at both of the steps 123a and 123b, such that the steps 123a and 123b form common contact surfaces with the key member 130, actually. Preferably, the steps 123a and 123b are spaced away from the plane containing both the axes 23a and 110a by a half of thickness 't' of the key member 130. According to this, the key member 130 can be held at the steps 123a and 123b more stably and accurately. On the other hand, the steps 123a and 123b may be formed to have slopes respectively each at an angle from the plane containing both the axes 23a and 110a. in more detail, the steps 123c and 123d may be formed in a radial direction extension line from, and perpendicular to, the crank pin axis 110a sloped at an angle θ from the plane containg both the axes 23a and 110a. Also, the steps 123e and 123f may be further sloped at an angle toward the limiting part about a cross point with an inner circumference of the crank pin 110. Even in above cases, the steps 123c, 123d, 123e and 123f have at least common contact point with the key member 130, for engagement with each other. Moreover, the track part 121 may be, not only the cut away part as shown in FIG. 7A, but also a pass through hole extended to a length along a circumferential direction at a depth from the top end of the sleeve 120 as shown in FIG. 7D. The track part 121 of such a pass through hole holds the key member 130 so as not to break away in a vertical direction.

Figure 7C:
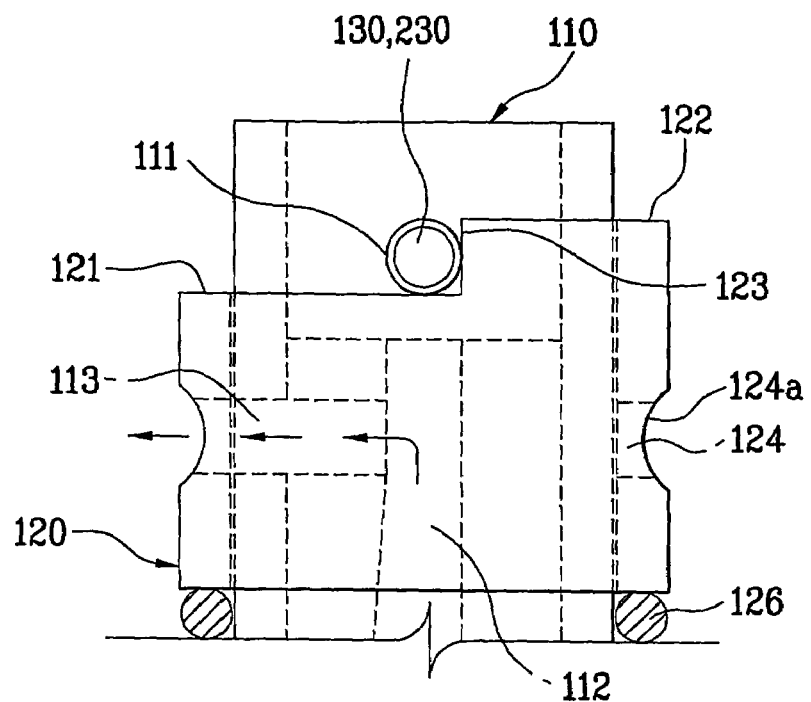
Figure 7D:
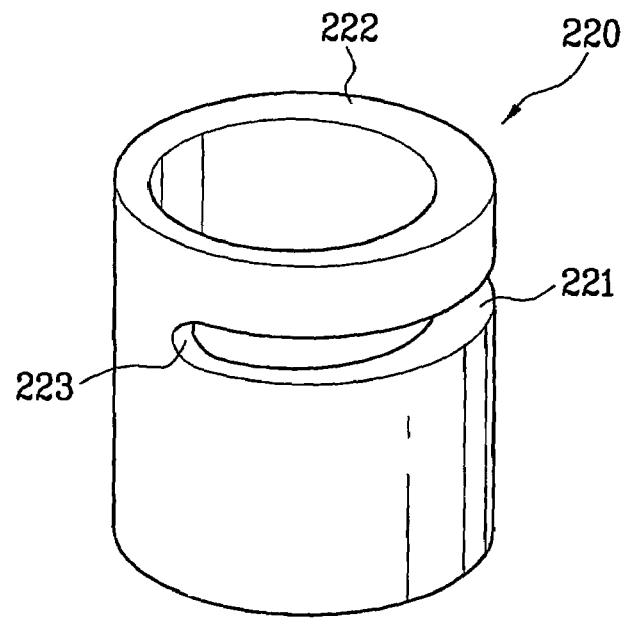

Other than this, referring to FIG. 7C, the eccentric sleeve 120 may further include oil supply holes 124 formed oppositely at a height. The oil supply holes 124 may be through holes formed in symmetry with respect to the plane containing both the axes 23a and 110a such that the oil supply hole 124 is in communication with the oil supply hole 113 in the crank pin when the key member 130 is held at the eccentric sleeve 110. Therefore, during operation of the compressor, one of the two oil supply holes 124 is in communication with the oil supply hole 113 regardless of the direction of rotation, allowing the lubrication oil supplied to the eccentric sleeve 120 and the connecting rod 33. In addition to this, an oil groove 124a is formed around the oil supply hole 124 to a depth, for forming a space for distributing the oil around the oil supply hole 124, thereby making supply of lubrication oil between the eccentric sleeve 120 and the connecting rod 33 easy. Referring to FIG. 7A again, the eccentric sleeve 120 may further include a seat 125 in each of the steps 123a and 123b. The steps 125 receive the key member 130 when the key member 130 is held at the eccentric sleeve 110. The seat 125 may be a groove in the step 123a or 123b actually, and it is preferable that a section of the key member 130 is fit to a section of the part in contact with the step 123. According to this, owing to the seats 125, the key member 130 can be held at the eccentric sleeve 120, stably. Moreover, owing to the seats 125, the key member 130 can make, not point to point contact, but surface to surface contact with the eccentric sleeve 120. Therefore, even if the key member 130 and the eccentric sleeve 120 are brought into repetitive contact during operation of the compressor, neither the key member 130, nor the eccentric sleeve 120, is broken due to stress concentration and fatigue caused thereby; Moreover, as shown in FIGS. 5A and 7C, there may be a ring member 126 provided between the eccentric sleeve 120 and the crank shaft 23. Because the ring member 126 and the eccentric sleeve 120 are in a line to line contact, a friction between them is reduced significantly, permitting to rotate smoother than the eccentric sleeve 120.

Figure 8:
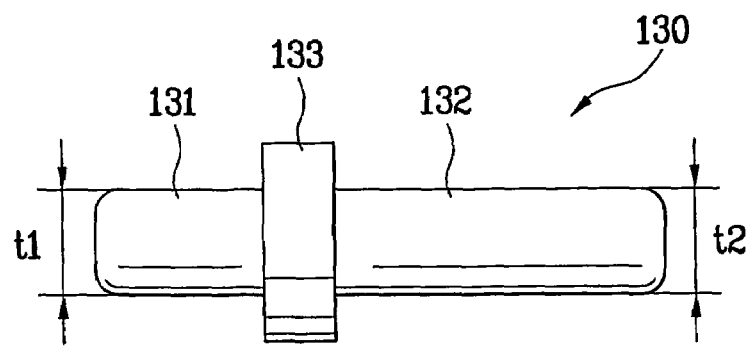
FIG. 8 illustrates a perspective view of a key member in accordance with a first preferred embodiment of the present invention.

FIGS. 5A, 5B, and 8 illustrate key members in accordance with a first preferred embodiment of the present invention, respectively. As shown, basically the key member 130 in accordance with a first preferred embodiment of the present invention includes a first projection 131 to be projected for a length beyond the crank pin 110 even when the compressor is not in operation, and a second projection 132 to be projected for a length beyond the crank pin 110 when the compressor is in operation. The key member 130 also includes a first stopper 133 for limiting a projection length of the first projection 131. Together with this, the key member 130 includes an elastic member 140 for regulating a position of the key member 130 during the compressor is stopped or in operation. In the present invention, the key member 130 holds the eccentric sleeve 120 while the key member 130 is moved by the centrifugal force. Especially, as described before, the second projection 132 holds the eccentric sleeve 120 as the second projection 132 is projected during operation. For being projected by the centrifugal force generated during operation, it is required that the second projection 132 is directed to the same direction with a direction of the centrifugal force. Therefore, as shown, while the second projection 132 is positioned at outer sides of radii of the crank shaft 23 and the crank pin 110 relatively, the first projection 131 is positioned at inner sides of radii of the crank shaft 23 and the crank pin 110. In other words, actually, the second projection 132 is arranged in the crank pin 110 spaced away from the axis 22a of the crank shaft for receiving a great centrifugal force, and relative to this, the first projection 131 is arranged adjacent to the center 22a. Moreover, in order to catch the eccentric sleeve 120 at the same time, it is preferable that the key member 130 has a length greater than an outside diameter of the crank pin 110 during operation of the compressor.

In more detail, referring to FIG. 5A, the first projection 131 is projected beyond the crank pin 110 and engaged with one of the steps 123a and 123b regardless of operation state (stop or in operation) of the compressor, and maintains an engaged state even during operation of the compressor. For this, the elastic member 140 is fitted on the second projection 132 and supports the first stopper 133 elastically, together with an inside wall of the crank pin 110. A length of the projection of the first projection is limited as the first stopper 133 of the key member 130 interferes with the inside wall of the crank pin 110. For more stable operation, it is preferable that the length of the first projection is at least a half of a minimum width of the steps 123a and 123b. Also, as described before, the first projection 131 is positioned at an inner side in a radial direction of the crank shaft 23 and the crank pin 110, the first projection 131 is projected toward the inner side in the radial direction, i.e., the axis 23a of the crank shaft, continuously. Therefore, the key member 130 is held at at least a part of the eccentric sleeve 120 relatively positioned at the inner side of radial direction of the crank shaft 23, always.

The second projection is projected in a direction opposite to the first projection, to engage with the other step during operation. According to this, the first and second projections 131 and 132 of the key member 130 engage with the eccentric sleeve 120 at the same time. The centrifugal force along the key member 130 becomes the greater gradually as the rotation speed of the crank shaft 23 becomes the faster to overcome the elastic force of the elastic member 140. According to this, the second projection is moved and projected in a direction of the centrifugal force (i.e., a length direction of the key member along a plane containing both the axes 23a and 110a). In this instance, the eccentric sleeve 120 rotates round the crank pin 110 for changing eccentricity when the compressor changes a direction of rotation. Therefore, in order not to interfere the rotation of the eccentric sleeve 120, it is required that the second projection 132 has a length a tip of which does not project beyond an outside circumference of the crank pin 110 when the compressor is not in operation.

The first and second projections 131 and 132 are engaged with the steps 123a and 123b alternately depending on the rotation direction of the crank shaft. Since the key member 130 is arranged perpendicular to, and on the plane containing, both the axes 23a and 110a or at least parallel thereto, respective contact positions of the key member 130 to the steps 123a and 123b differ if thickness 't1' and 't2' of the first and second projections differ. Therefore, the thickness 't1' and 't2' of the first and second projections 131 and 132 are required to have the same thickness for accurate engagement with the steps 123a and 123b. Though a section of the key member 130 is circular in the drawing and description of the present invention, any form of the section, such as square or hexagonal, that can make engagement with the steps 123a and 123b, may be used.

Figure 9:
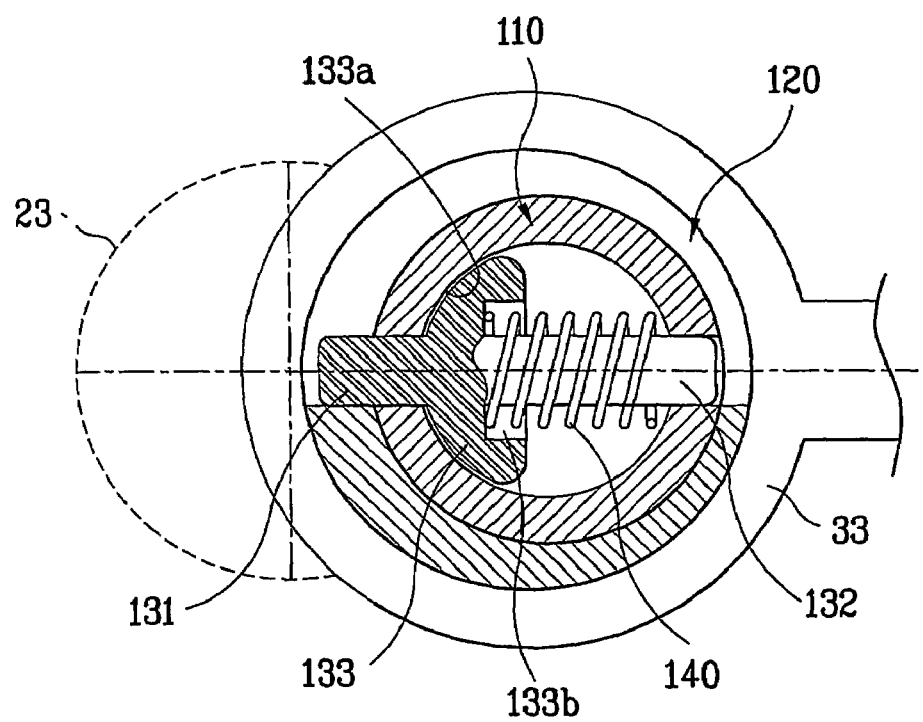
FIG. 9 illustrates a plan view of a variation of the key member to a crank pin in FIG. 8.

Referring to FIG. 9, a contact surface 133a of the first stopper 133 may have a form fit to an inside circumferential surface of the crank pin 100. According to this, the key member 130 can be engaged with the crank pin 110 exactly, and can make more smooth operation owing to an increased weight thereof (i.e., an increased centrifugal force makes an easy projection of the second projection 132). Preferably, the first stopper 133 may further include a recess 133b for making stable reception of the elastic member 140. Such contact surface 133a and the recess 133b supplement stable operation of the key member 230, actually. In the meantime, the first stopper 133 may be formed as a unit with the key member 130, or separately to be fitted to the key member 130. Examples of such separate type first stopper 133 are shown in FIGS. 10A and 10B.

Figure 10A:
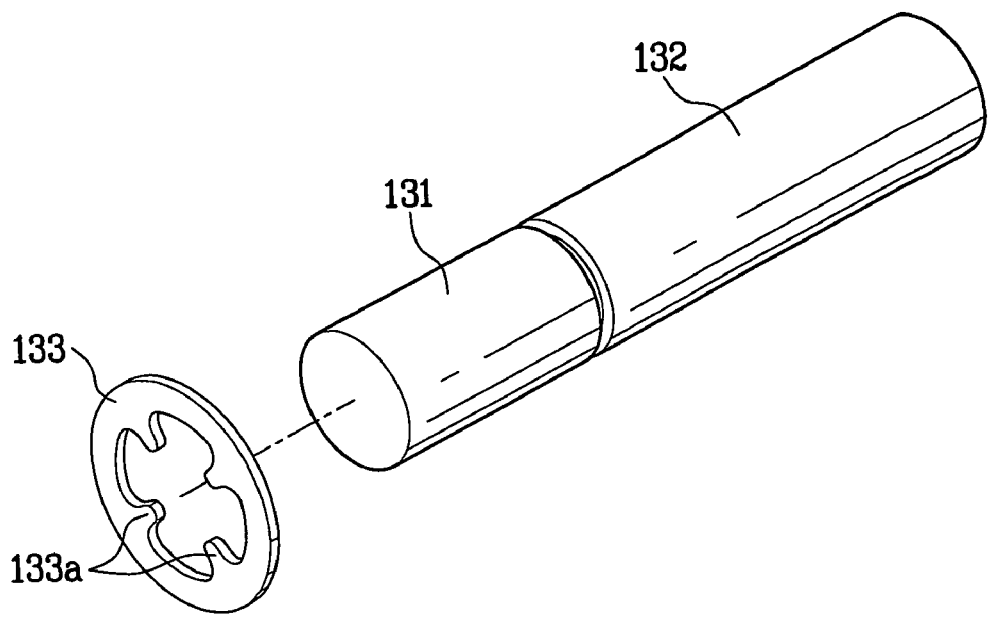
FIGS. 10A and 10B illustrate perspective views of key members each having a detachable first stopper in accordance with a first preferred embodiment of the present invention.
Figure 10B:
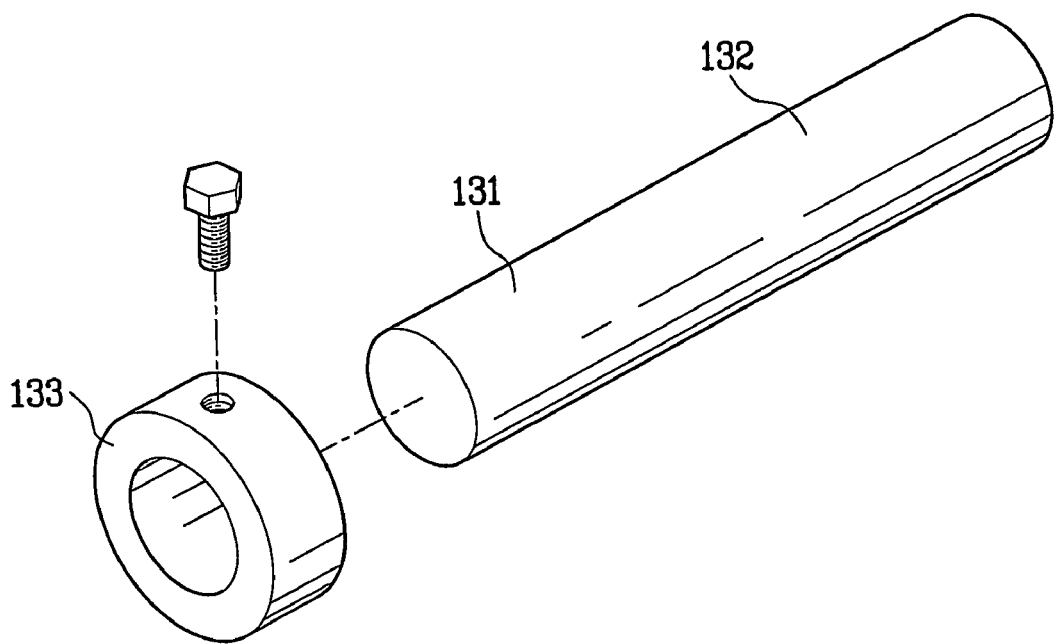

Referring to FIG. 10A, the first stopper 133 may include projections 133a extended inward in a radial direction. According to this, the first stopper 133 is fitted to the key member 130 as the projections 133a are inserted in a circumferential groove in a position of the key member 130. Or, as shown in FIG. 10B, the first stopper 133 of a simple ring member may be fastened to a position of the key member 130 with a fastening member. These separate type stoppers 133 enable fitting of the key member 130 to the crank pin 130 even when both of the key member fitting parts 111a and 111b are through holes. In more detail, by placing the stopper 133 on an inside of the crank pin 110, and inserting the key member 130 through the through holes, the stopper 133 and the key member 130 are joined.

In the meantime, as described before, in the key member 130, the projection length of the second projection 132 in the key member 130 can be regulated by the elastic force of the elastic member 240 during regular operation. However, the transient sharp acceleration of the crank shaft 23 and the crank pin 110 at starting of the compressor causes a substantially great momentary centrifugal force acted on the key member 130. It is liable that the second projection 132 is projected excessively by the centrifugal force enough to cause the first projection 131 broken away from the fitting part 111. Therefore, it is preferable that the key member 130 further includes a second stopper 134 for limiting the projection length of the second projection 133 beyond the crank pin 110 by the centrifugal force.

Figure 11A:
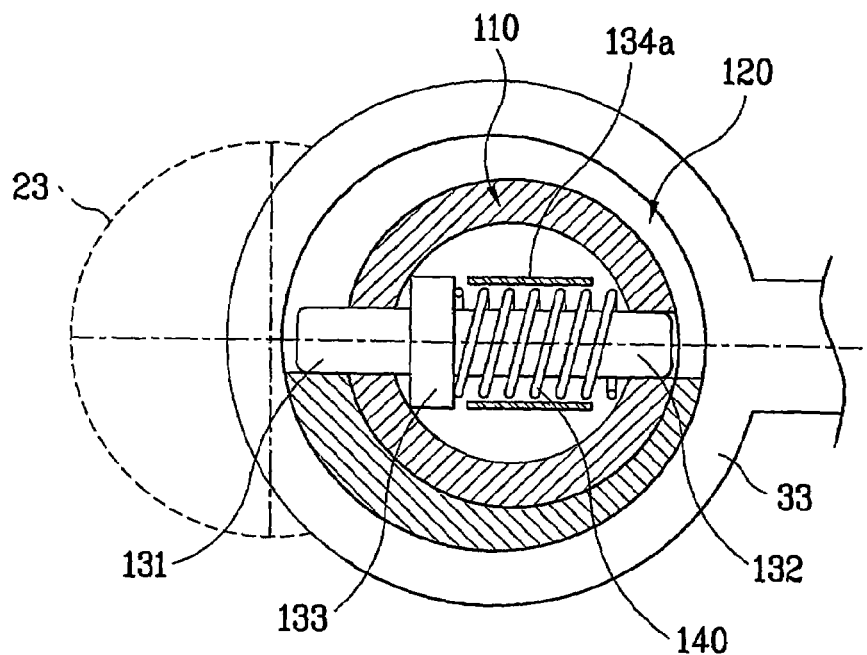
FIGS. 11A~11C illustrate plan views of key members each having a second stopper in accordance with a first preferred embodiment of the present invention.
Figure 11B:
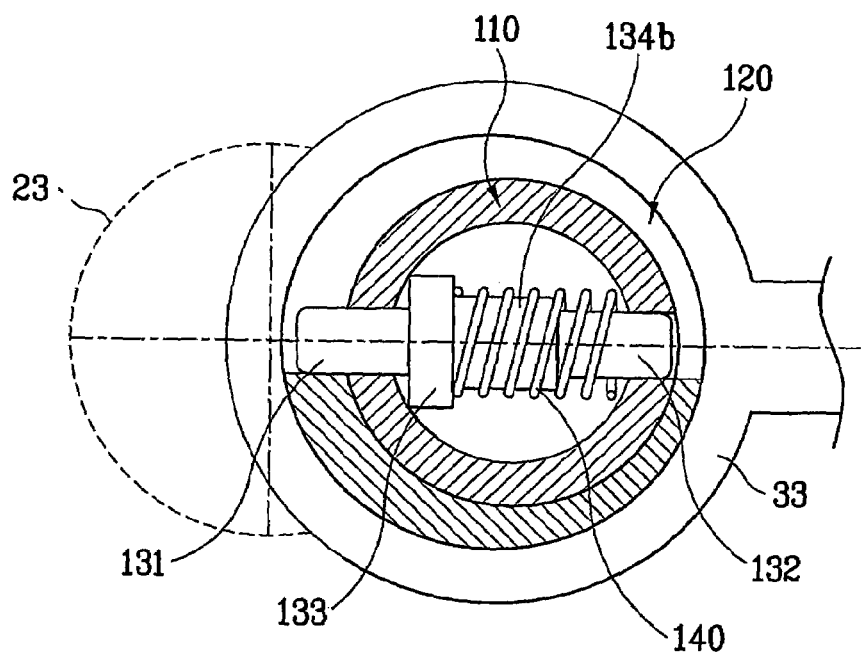
Figure 11C:
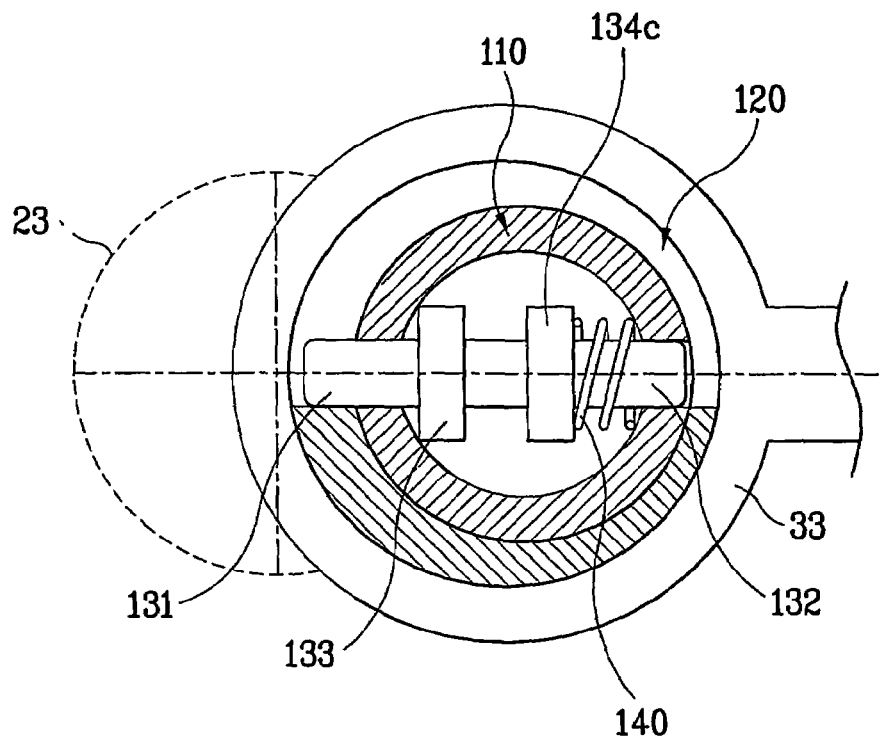

Referring to FIG. 11A, the second stopper 134 may be a hollow tube member 134a movably fitted on the second projection 132 in a length direction of the second projection 132. In this instance, the elastic member 140 is arranged between the second stopper 134a and the second projection 132. The second stopper 134a comes into contact both with the first stopper 133 and an inside wall of the crank pin 110 when the key member 130 moves in a direction of the centrifugal force, thereby preventing the second projection 133 from being projected more than a certain length. As shown in FIG. 11B, the second stopper 134 may be an extension 134b having a thickness at least greater than a thickness of the second projection 133. That is, the second stopper 134b in FIG. 11B is a lengthwise extension of the first stopper 133, actually. In this case, the elastic member 140 is fitted on an outside circumference of the second stopper 134b. Or, as shown in FIG. 11C, the second stopper 134 may be a radial direction extension 134c of the second projection to a required thickness, having a form similar to the first stopper 133, actually. In this case, the elastic member 140 is fitted between the second stopper 134b and the inside circumferential surface of the crank pin 110. Similar to variations to the first stopper 133 described with reference to FIGS. 10A and 10B, the stoppers 134b and 134c may be fastened to the key member 130 with separate members, respectively.

Figure 12:
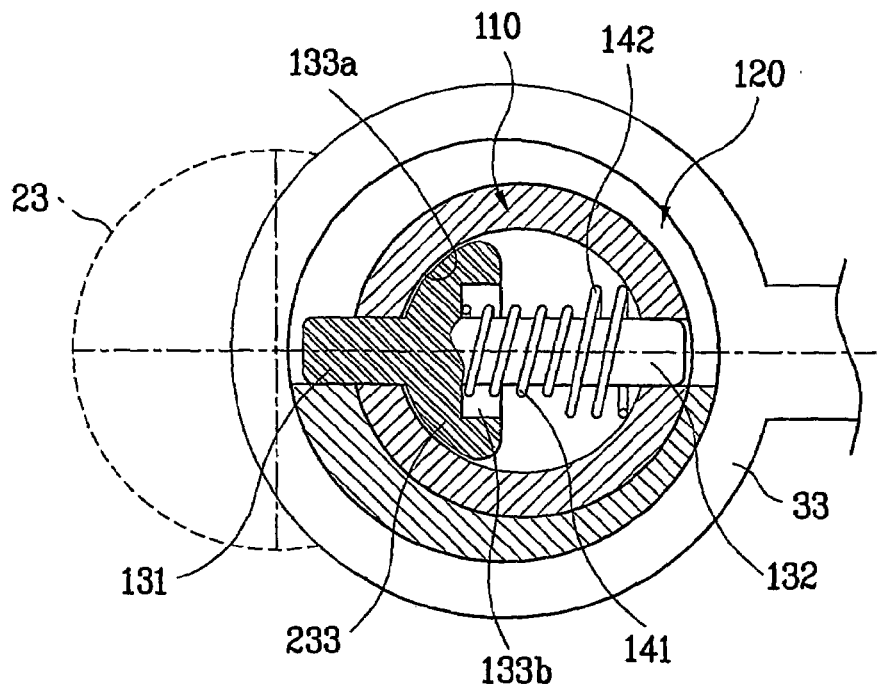
FIG. 12 illustrates a plan view of a variation of an elastic member applied to the first embodiment key member.

Alternatively, as shown in FIG. 12, instead of the second stopper 134, it may be designed that the elastic member 140 limits movement of the key member 130, more specifically, the second projection 132. For this, the elastic member 140 has non-uniform spring constant, such that a part thereof has a greater elastic force relative to the other part. According to this, the elastic member 140 is deformed relatively less during operation of the compressor, to reduce the projection length of the second projection 132, such that projection of the second projection 132 is suppressed substantially even if the transient excessive centrifugal force acts thereon, thereby preventing break away of the first projection 131 from the crank pin 110. More preferably, if a part of the elastic member 140 has an elastic force greater than the greatest centrifugal force of the compressor, an excessive projection of the second projection 132 can be prevented, perfectly.

Referring to FIG. 12, actually such an elastic member 140 includes a first elastic member 141 with a predetermined elastic force, and a second elastic member 142 with an elastic force greater than the elastic force of the first elastic member 141. The first elastic member 141 is in contact with the first stopper 133 for keeping projecting the first projection 131. Alikely, the second elastic member 142 is in contact with the first elastic member and supported on an inside circumferential surface of the crank pin 110, for projecting the first projection 131 and being deformed together with the first elastic member 141. In more detail, as shown, if the elastic member 140 has a form of a spring, the first elastic member 141 is a spring with a predetermined diameter, and the second elastic member 142 is a spring continuous from the first elastic member 141, with a diameter greater than the first elastic member 141, designed to have a greater spring constant, and a greater elastic force. As described before, it is preferable that the second elastic member 141 has an elastic force greater than the greatest centrifugal force of the compressor for prevention of the excessive projection of the second projection 142, perfectly. That is, in this case, only the first elastic member 141 is deformed, and the second elastic member 142 is not deformed by the centrifugal force. According to this, similar to the second stopper 134, the second elastic member 142 prevents the excessive movement of the key member 140. Since the elastic member 142 can prevents break away of the key member 130 even without the second stopper 134, a structure of the key member 130 can be simplified, and also makes fitting of the key member 130 easy.

In summary, basically the key member 130 has a length greater than a diameter of the crank pin by at least a predetermined amount, and is movably fitted in the crank pin. At least a part of the key member 130 (i.e., the first projection) is projected from the crank pin even if the compressor is not in operation, and the other part thereof (the second projection) is projected from the crank pin 110 by the centrifugal force during the compressor is in operation. That is, the key member 130 is held at least at a part of the eccentric sleeve 120 continuously, and held at the eccentric sleeve 120 additionally when the compressor is in operation. Therefore, the key member 130 is substantially in contact with the eccentric sleeve 120 at a plurality of points, and more particularly, during the operation of the compressor, the key member 130 is in contact with both of opposite ends of the eccentric member 120 set up with reference to an arbitrary center line thereof in a horizontal plane. Eventually, the key member 130 makes the eccentric sleeve 120 coupled with the rotating crank pin 110 positively in any direction rotation of the motor, thereby preventing the eccentric sleeve 120 and the crank pin 110 from moving relative to each other.

Figure 13A:
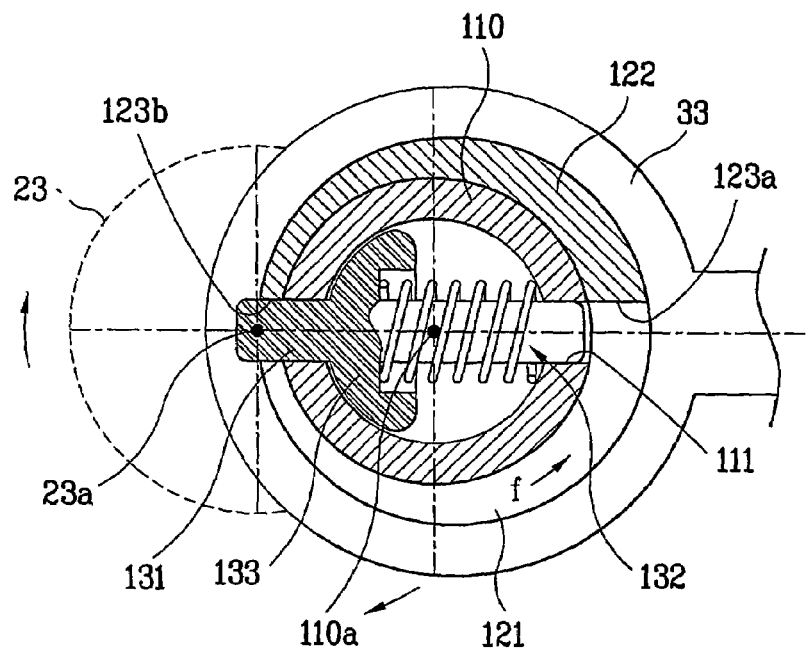
FIGS. 13A and 13B illustrate plan views each showing operation of a dual capacity compressor having the first preferred embodiment of the present invention applied thereto in a clockwise direction rotation.
Figure 13B:
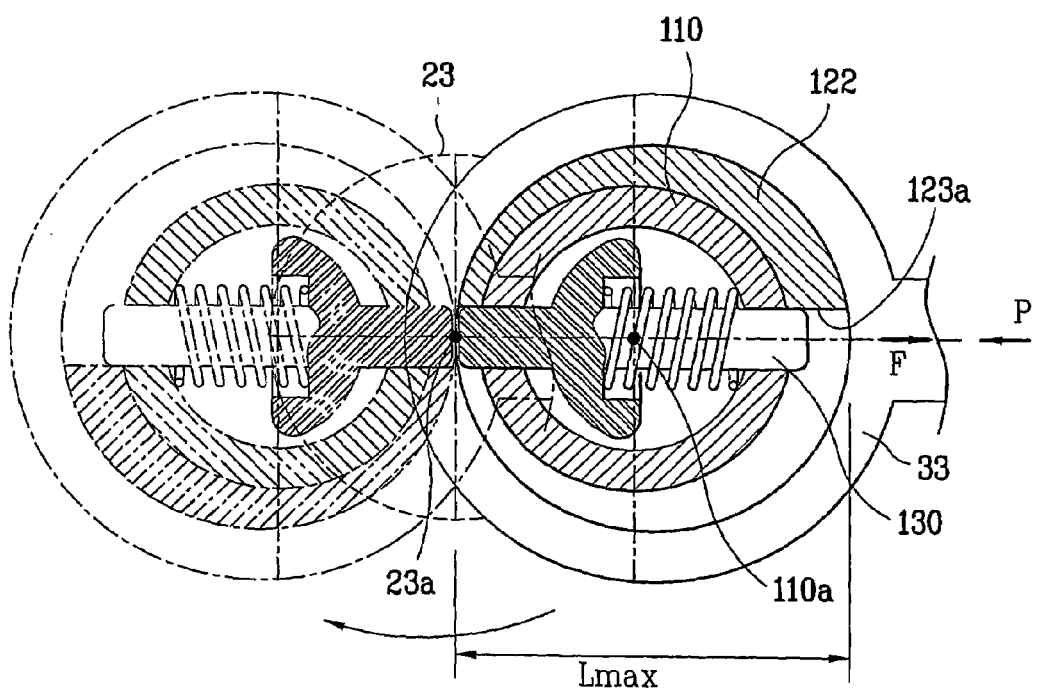
Figure 14A:
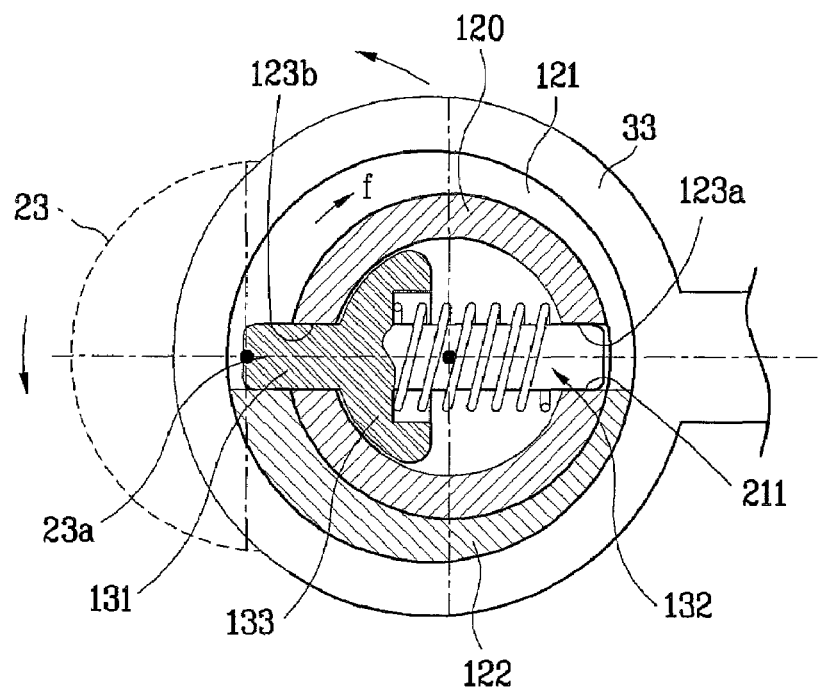
FIGS. 14A and 14B illustrate plan views each showing operation of a dual capacity compressor having the first embodiment key member applied thereto in a counter clockwise direction rotation.
Figure 14B:
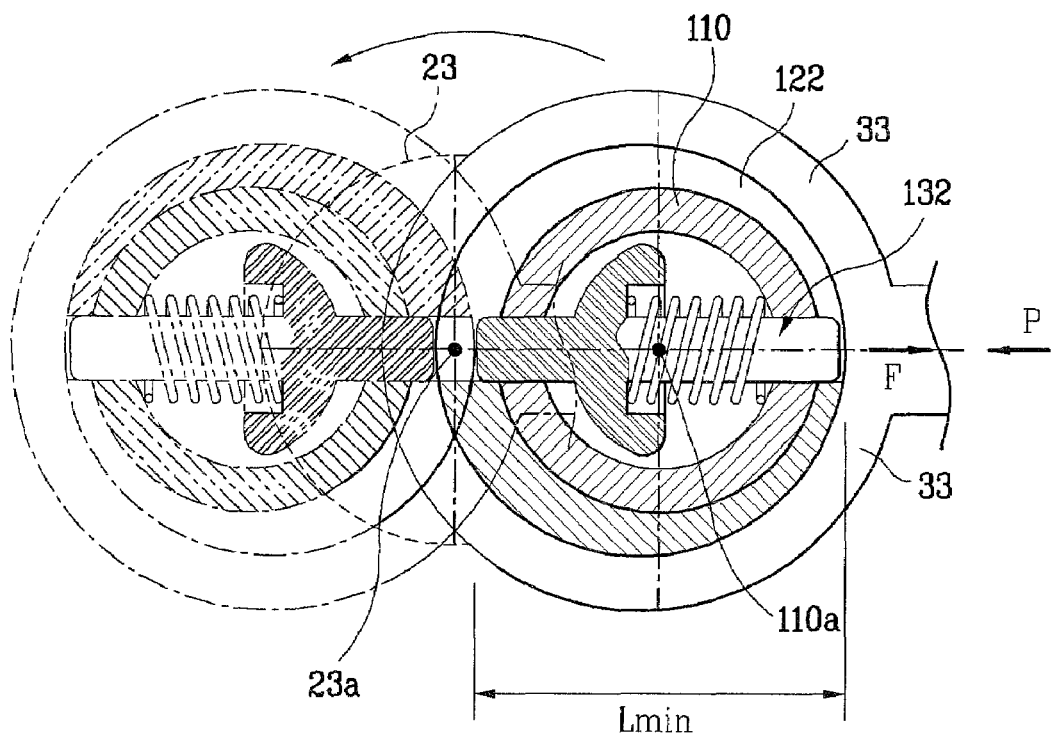

The operation of the dual capacity compressor of the present invention will be described with reference to the attached drawings. FIGS. 13A and 13B illustrate plan views each showing operation of a dual capacity compressor of the present invention in a clockwise direction rotation, and FIGS. 14A and 14B illustrate plan views each showing operation of a dual capacity compressor of the present invention in a counter clockwise direction rotation.

FIG. 13A illustrates a relative position between the key member 130 and the eccentric sleeve 120 when the crank shaft starts to rotate in a regular direction, i.e., a clockwise direction. As described, the first projection 131 is always projected beyond the crank pin 110 by an elastic force in a direction inward of a radius of the crank pin 110. In a state the first projection 131 is projected, if the crank shaft 23 starts to rotate in the clockwise direction, the crank pin, the eccentric sleeve, and the key members 110, 120, and 130 start to revolve around the axis 23a of the crank shaft in the clockwise direction. During the revolution, there is a relative friction force 'f' between the crank pin 110 and the connecting rod 33 in a direction opposite to the rotation direction. According to this, the eccentric sleeve 120 rotates around the crank pin 110a in a counter clockwise direction by the friction force 'f', until the step 123b at the thin side is caught at the first projection 131. Once the crank shaft 23 rotates, since the friction force 'f' is generated continuously during rotation of the crank shaft 23, the caught state between the first projection 131 and the step 12b is continued. In this instance, as shown in FIG. 13B, if the rotating angular speed reaches to a certain level, the key member 130 moves along a direction of action of the centrifugal force 'F', i.e., a length direction of the key member along the plane containing both the axes 23a and 110a by the centrifugal force 'F'. According to this, the second projection 132 is engaged with the step 223a at the thick side, and the first projection also maintains a state of contact with the step 123b at the same time. This multiple point simultaneous contact enables the key member 130 to be in full engagement with the eccentric sleeve 120. Therefore, in the regular direction rotation, even if an external force 'P' from expansion of the working fluid after the compression, and other forces are received through the connecting rod 330, relative rotation between the crank pin 210 and the eccentric sleeve 220 is prevented. Also, in a case a local rotational moment is generated at the eccentric sleeve 120, a relative rotation of the eccentric sleeve 120 with respect to the crank pin 110 can be prevented. Also, referring to FIG. 13B, a solid line part in the drawing illustrates a top dead center state and a dashed line part in the drawing illustrates a bottom dead center state, and the eccentric sleeve 220 is arranged so as to provide the greatest eccentricity between the piston (not shown) connected to the connecting rod 33 and the crank pin 110, in the regular directional rotation. Accordingly, the piston reciprocates in the greatest stroke length Lmax, and the compressor of the present invention has a maximum compression capacity.

In the meantime, if the crank shaft 23 starts to rotate in a reverse, i.e., the counter clockwise direction, the relative friction force 'f' is generated between the crank pin 110 and the connecting rod 33 in an opposite direction of the rotation direction, i.e., in the clockwise direction. Then, the eccentric sleeve 120 rotates in the clockwise direction around the axis of the crank pin 110a starting from a position shown in FIG. 13A, until the step 123a at the thick side is engaged with the first projection 131 as shown in FIG. 14A. Alikely, during rotation of the crank shaft 23, the state of engagement between the first projection 131 and the step 123a is maintained by the friction force 'f'. Alike the regular direction rotation, as shown in FIG. 14B, if a rotational angular speed reaches to a certain level, the second projection 232 is engaged with the step 123b at the thin side by the centrifugal force 'F', such that the multiple point contact state is made between the eccentric sleeve 120 and the key member 130. Therefore, in the reverse direction rotation, even if the external force 'P' from the pressure the working fluid acts to the piston during the compression, and any other forces are received, the relative rotation between the crank pin 110 and the eccentric sleeve 120 can be prevented. Also, as shown in FIG. 14B, in a case of the reverse direction rotation, since the eccentric sleeve 120 is arranged to have a minimum eccentricity, the piston reciprocates in a minimum stroke length Lmin, such that the compressor of the present invention has a minimum compression capacity.

In conclusion, by eliminating the relative motion between parts that maintain the eccentricity by means of the key member 130, i.e., the crank pin 110 and the eccentric sleeve 120 perfectly, the compressor of the present invention can make stable operation in any state of operation, i.e., in the regular or reverse direction rotation.

Figure 15A:
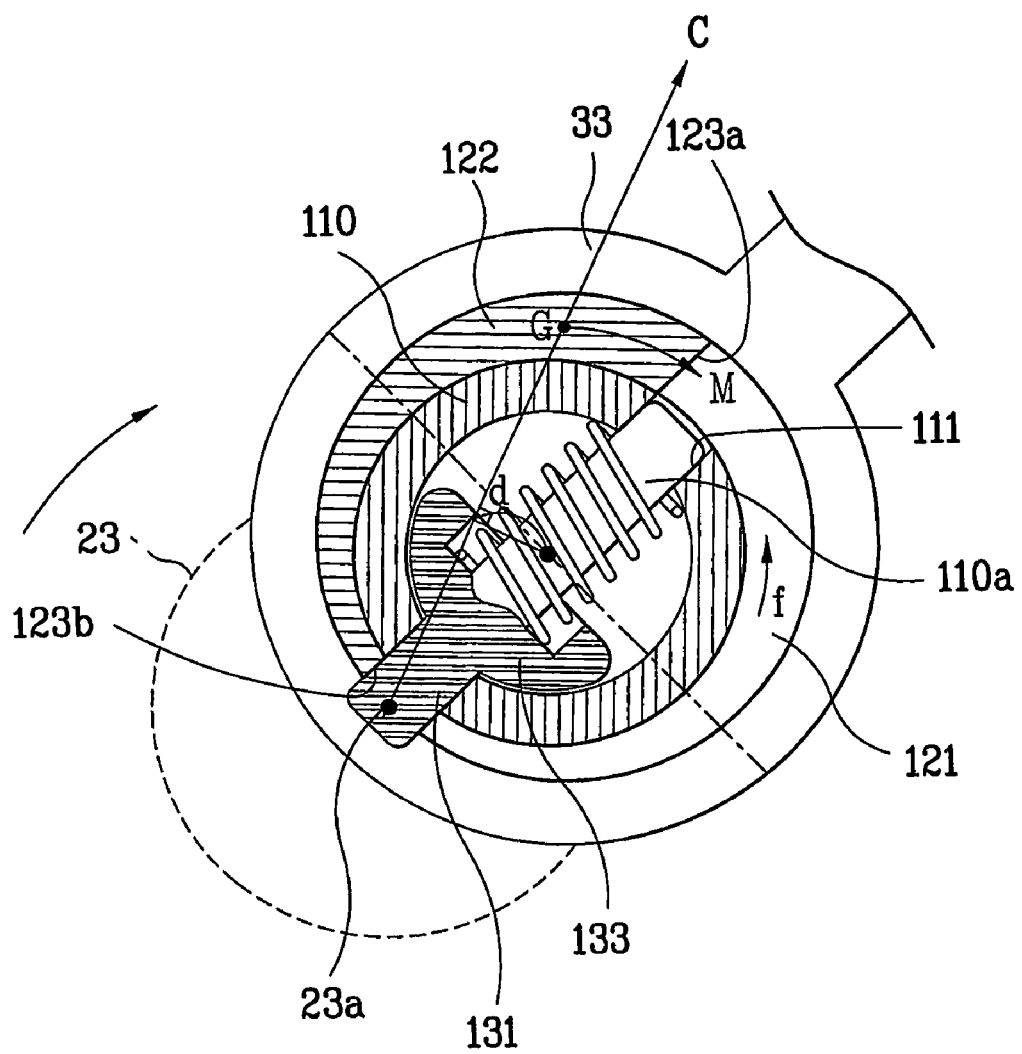
FIGS. 15A and 15B illustrate plan views each showing a relation of forces generated at an eccentric sleeve having the first embodiment key member applied thereto in a clockwise, and a counter clockwise direction rotations.
Figure 15B:
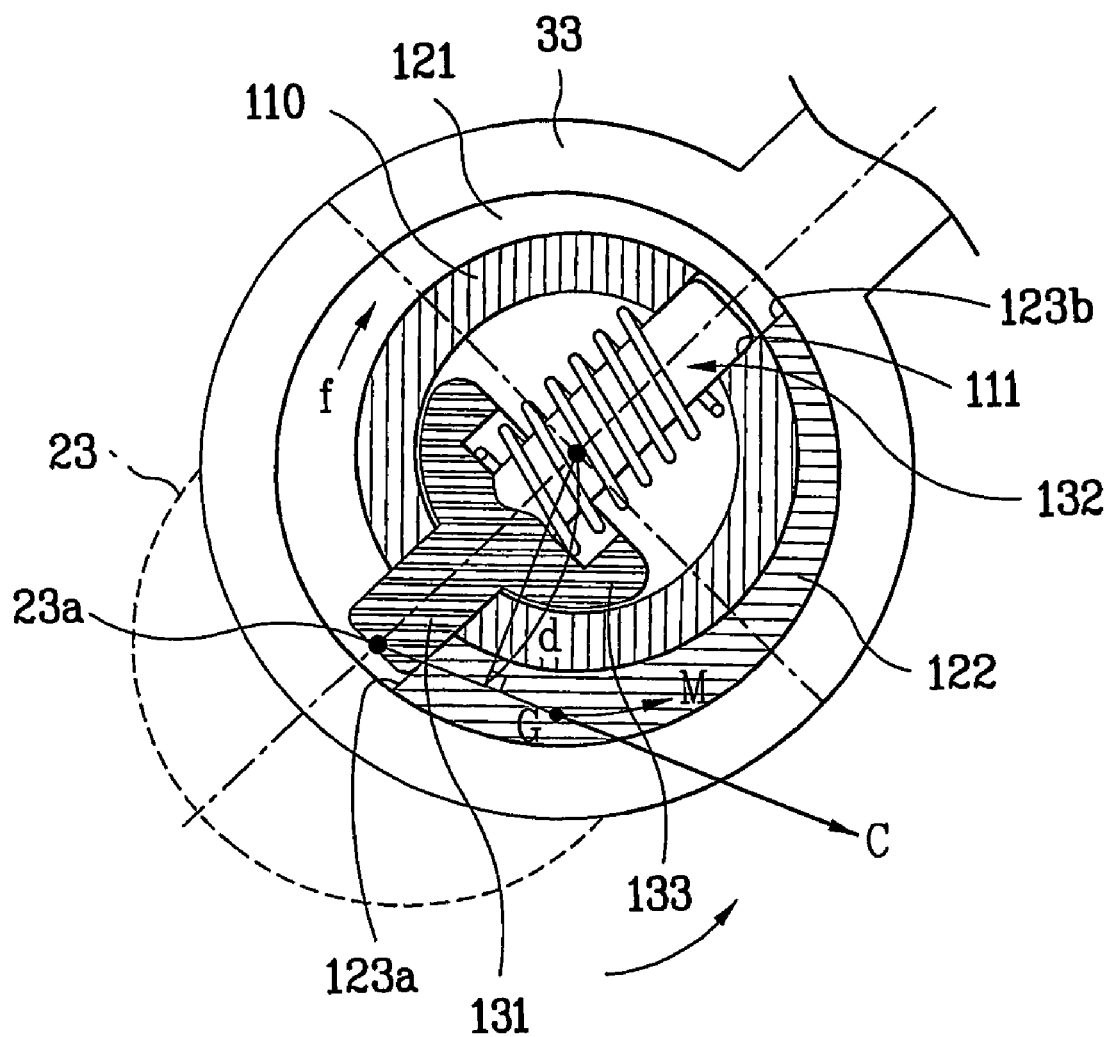

In the meantime, referring to FIGS. 15A and 15B, the eccentric sleeve 120 has an eccentric center of gravity 'G' due to its structure. That is, the center of gravity 'G' is on a side of the limiting part 122 that is heavier. During rotation of the crank shaft 23, a centrifugal force 'C' acts on the center of gravity 'G' along an extension line between the center of gravity 'G' and the axis 23a of the crank shaft perpendicular to the axis 23a of the crank shaft 23. As the center of gravity 'G' is eccentric, the centrifugal force 'C' generates a rotational moment 'M' around the axis 23a of the crank pin. In more detail, as shown, the rotational moment 'M' can be expressed as a product of the centrifugal force 'C' and an arm length 'd' perpendicular to the axis 23a of the crank pin. The rotational moments 'M' acts in a direction the same with a rotational direction of the crank shaft. That is, as shown in FIG. 15A, during the clockwise direction rotation, a clockwise direction rotational moment is generated at the eccentric sleeve by the center of gravity 'G', and as shown in FIG. 15B, during the counter clockwise direction rotation, a counter clockwise direction rotational moment is generated at the eccentric sleeve by the center of gravity 'G'. As described before, while the friction force 'f' tends to rotate the eccentric sleeve 120 in a direction opposite to the rotational direction until the eccentric sleeve 120 engages with the first projection 131, the rotational moment 'M' tends to rotate the eccentric sleeve 120 to a rotational direction of the compressor. Therefore, the rotational moment 'M' may cause the eccentric sleeve 120 to make an intermittent fine rotation, that results in disengagement of the eccentric sleeve 120 from the key member 130. The rotation of the eccentric sleeve 120 impedes projection and latching of the second projection.

The second embodiment key member 230 prevents such a rotation of the eccentric sleeve 120 caused by the centrifugal force 'C'/rotational moment 'M'. The key member 230 is illustrated in detail in FIGS. 16A~16C, and 17.

As shown, basically, the second embodiment key member 230 includes a first projection 231, and a second projection 232 each of which is always projected at a length beyond the crank pin 110 during operation. The second projection 232 is not engaged with the eccentric sleeve 120 when the compressor is stationary, and moves to engage with the eccentric sleeve 120 during operation of the compressor. The key member 230 also includes a first stopper 233 for limiting movement of the key member 230 in a certain direction. The first stopper 233 limits an inward radial direction movement and a projection length of the second projection 232. Along with this, alike the first embodiment, there is an elastic member 140 provided to the key member 230 for regulating a position of the key member 230. As shown in FIGS. 15A and 15B previously, since the eccentric sleeve 120 rotates by the centrifugal force 'C' and the rotational moment 'M', it is difficult that the key member 130 latches a part of a radial direction outer part of the eccentric sleeve 120. Therefore, it is preferable that the second embodiment key member 230 has the part of the radial direction outer part of the eccentric sleeve 120 kept engaged therewith starting from putting the compressor into operation. To do this, while the first projection 231 that is to be kept projected is positioned on a radial direction outer side of the crank shaft 23 and the crank pin 110, the second projection 231 is positioned on a radial direction inner side. In other words, for prevention of rotation of the eccentric sleeve 120, the first projection 231 is arranged away from the axis 22a of the crank shaft in the crank pin 110, and relative to this, the second projection 131 is arranged close to the axis 22a.

Figure 16A:
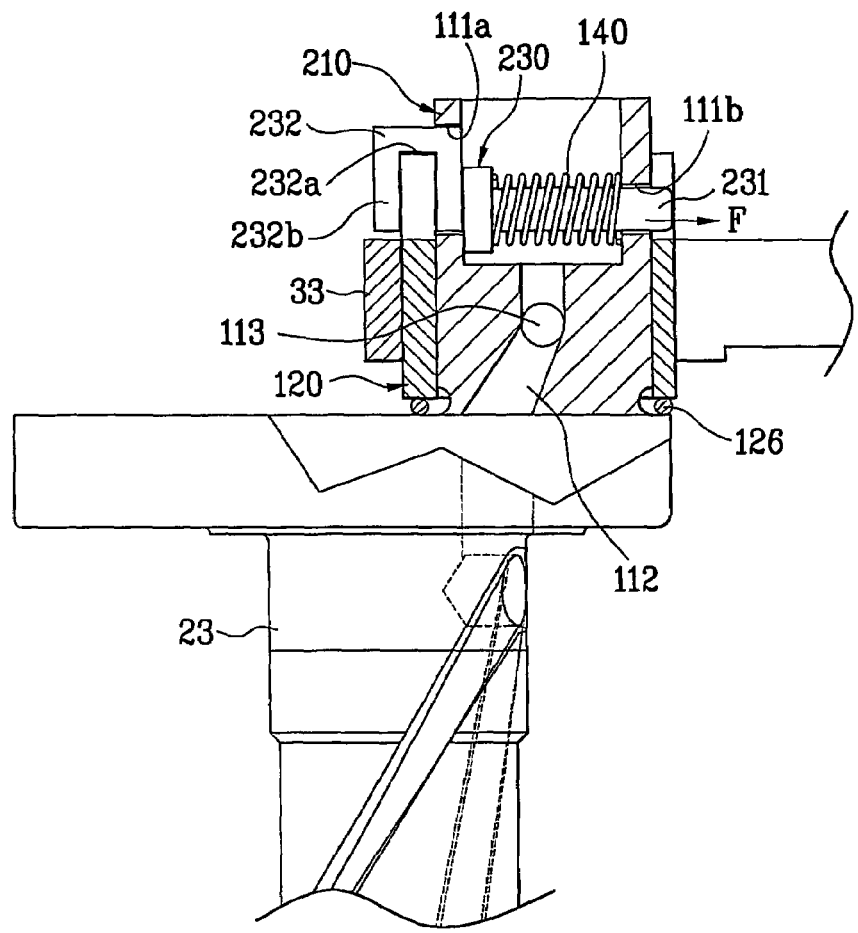
FIGS. 16A~16C illustrate side, and plan views with partial cut away views each showing a dual capacity compressor of the present invention having the second embodiment key member applied thereto.
Figure 16B:
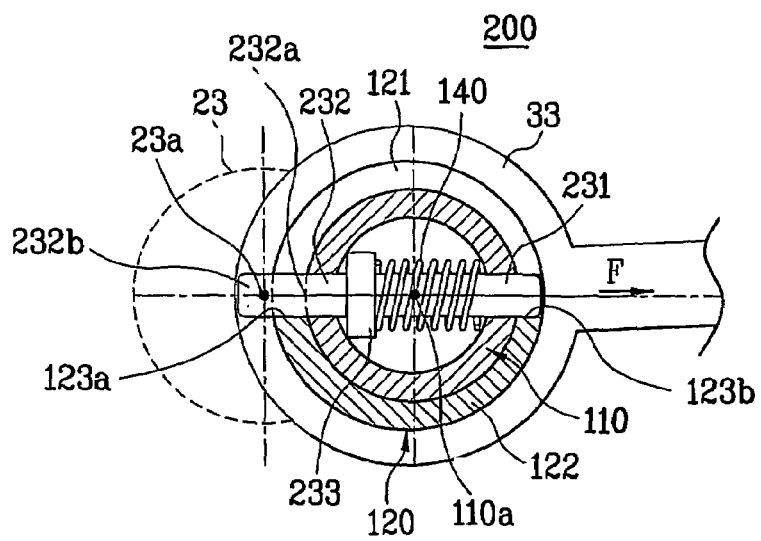
Figure 16C:
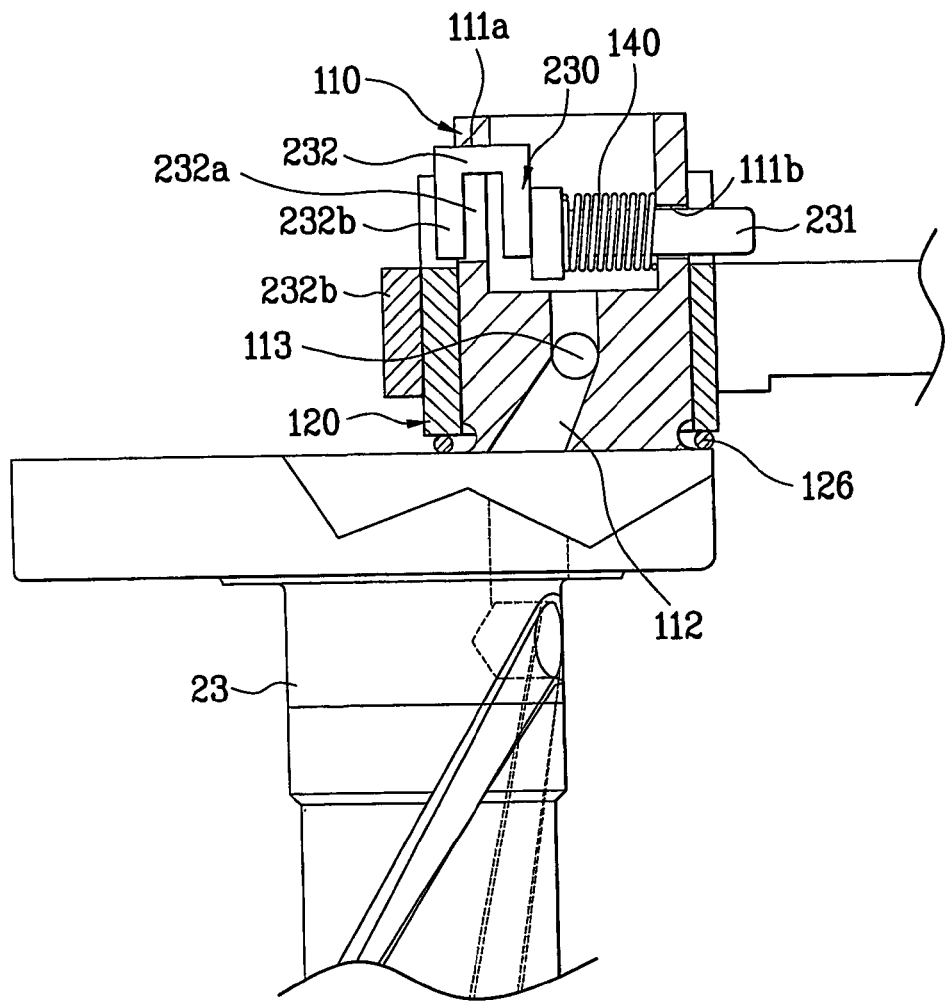
Figure 17:
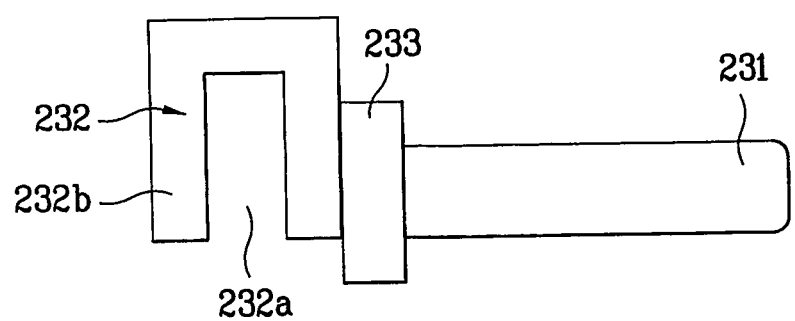
FIG. 17 illustrates a side view of a key member in accordance with a second preferred embodiment of the present invention.

In more detail, as shown in FIG. 16A, the first projection 231 has a length enough to keep projected beyond the crank pin 110, and as described before, the first projection 231 is projected toward the radial outer side of the crank shaft 23 and the crank pin 110 the same as a direction of the centrifugal force generated during operation. Therefore, as shown in FIG. 16C, the first projection 231 is projected further toward the radial outer side by the centrifugal force during operation, thereby keeping the engagement with the eccentric sleeve 120 even during the operation of the compressor.

The second projection 232 is projected beyond the crank pin 210 in a direction opposite to the first projection 231 by the elastic force of the elastic member 140. For this, the elastic member 140 is fitted on the first projection 232 to support the first stopper 233 together with an inside wall of the crank pin 110, elastically. A length of projection of the second projection 232 is limited as the first stopper 233 on the key member 130 is caught at the inside wall of the crank pin 110. In the meantime, at the time of change of the rotation direction of the compressor, the eccentric sleeve 120 rotates around the crank pin 110 for change of the eccentricity. Therefore, in order not to impede the rotational movement of the eccentric sleeve 120, it is required that the second projection 232 is projected beyond the crank pin 110 for preventing the second projection 232 from interfering the eccentric sleeve 120 when the operation stops. In more detail, as shown, the second projection 232 has a channel 232a for enabling the eccentric sleeve 130 to pass therethrough. It is preferable that the channel 232a has a width slightly greater than a greatest width of the eccentric sleeve 130. The channel 232a permits that an end 32b of the second projection is positioned on an outside of the eccentric sleeve 120. During operation, the centrifugal force 'F' generated along the key member 230 becomes the greater as the rotation speed of the crank shaft 23 becomes the greater, and becomes greater than the elastic force of the elastic member 140. The second projection moves in a centrifugal force direction (the length direction of the key member along a plane containing both the axes 23a, and 110a) by the centrifugal force 'F' until the end 232b of the second projection interferes with the eccentric sleeve 120 as shown in FIG. 16C. According to this, during operation, the first, and second projections 231, and 232 of the key member 230 are engaged with the eccentric sleeve 120, at the same time.

The second embodiment key member 230 is applicable to the dual capacity compressor of the present invention without change of the crank pin 110, and the eccentric sleeve 120. As the crank pin 110 and the eccentric sleeve 120 have been described with reference to FIGS. 6A~7D, no more description will be provided, while additional features of the key member 230 will be provided.

Figure 18:
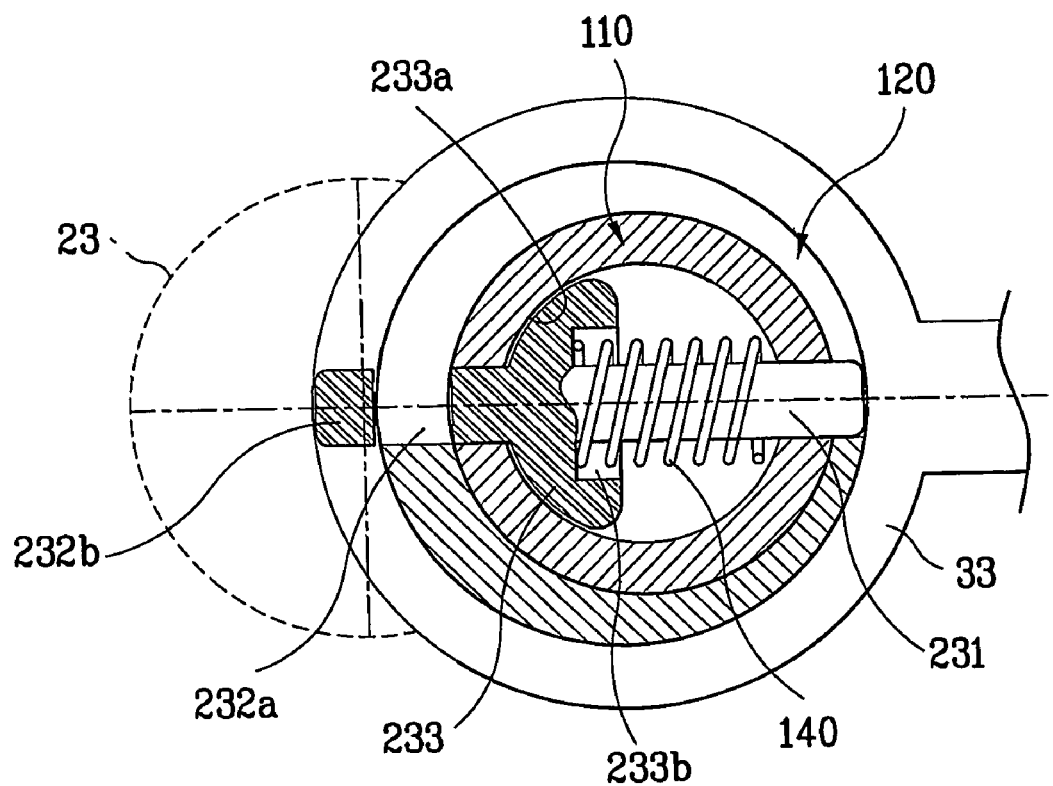
FIG. 18 illustrates a plan view of a variation of a key member fitted in a crank pin in accordance with a second preferred embodiment of the present invention.

Referring to FIG. 18, the first stopper 233 includes a contact surface 233a having a shape fit to an inside circumferential surface of the crank pin 110, and, preferably together with a pocket 233b for the elastic member 140. The contact surface 233a and the pocket 233b assist stable operation of the second embodiment key member 230. The first stopper 233 is formed as a unit with the key member 230, or fabricated as a separate member.

Figure 19A:
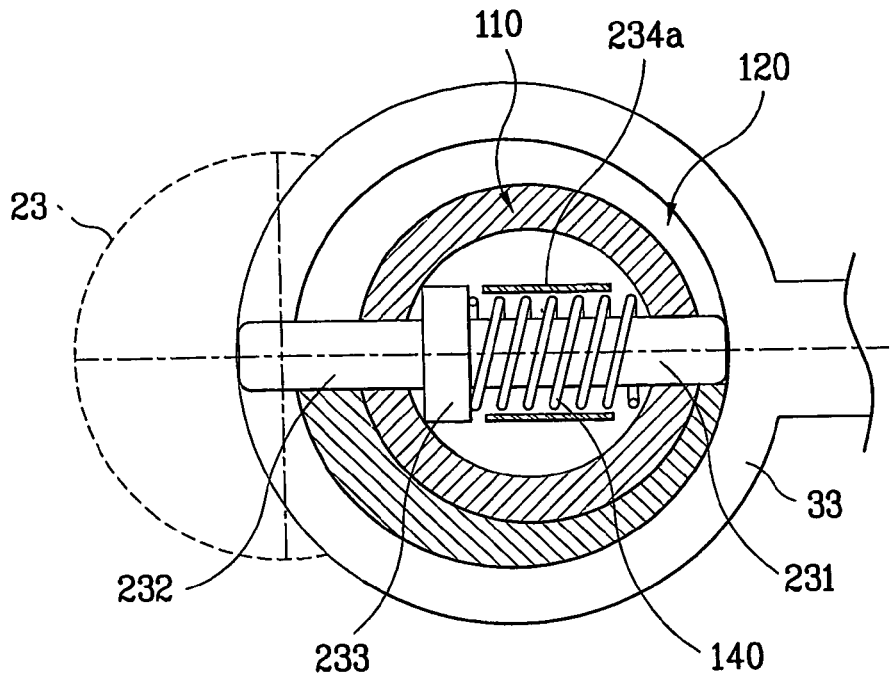
FIGS. 19A~19C illustrate plan views each showing a key member having a second stopper in accordance with a second preferred embodiment of the present invention.
Figure 19B:
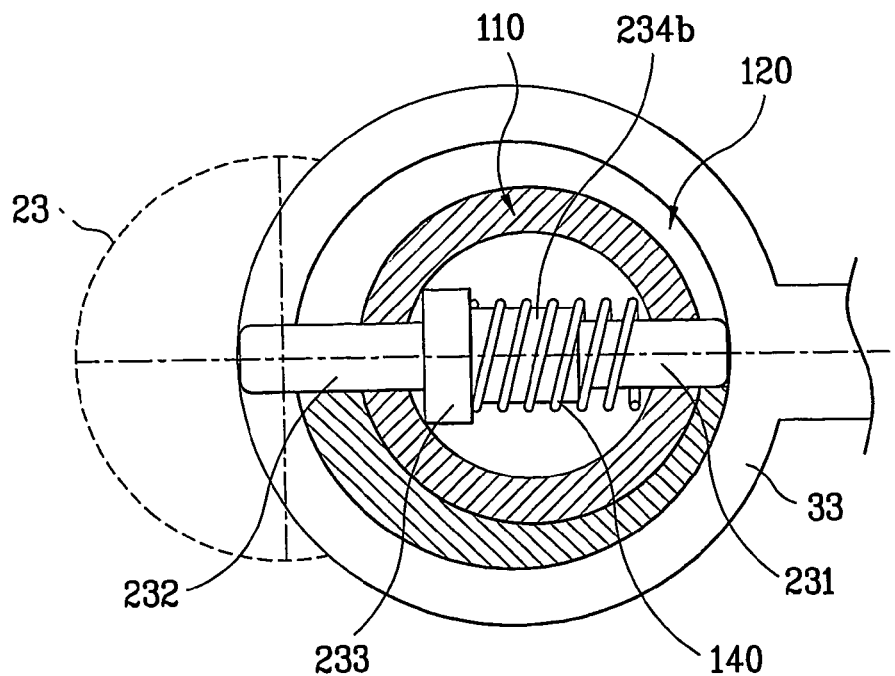
Figure 19C:
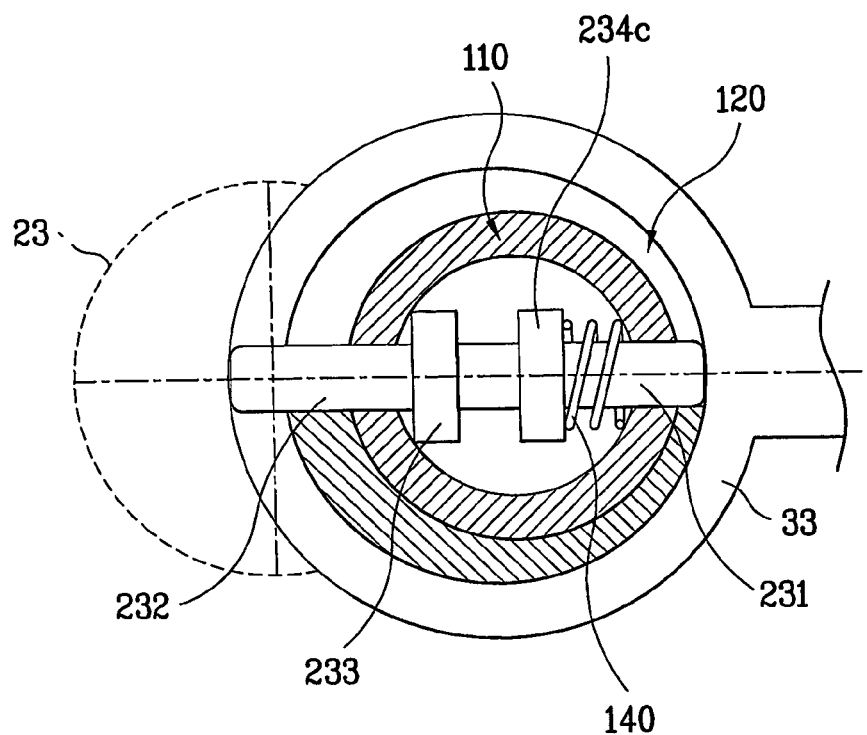

The projection and movement of the first, and second projections 231, and 232 can be regulated by the elastic force of the elastic member 140 during regular operation. However, as described before, it is liable that the key member 230 may break away by a transient centrifugal force, and particularly, the second projection 232 may not be engaged with the eccentric sleeve 120, accurately. For preventing such irregular operation of the key member 230, preferably, a second stopper 234 may be further included for limiting movement of the key member 230 in the direction of the centrifugal force of the key member 230. As shown in FIGS. 19A~19C, the second stopper has a shape the same with the first embodiment. That is, the second embodiment stopper 234 may be a hollow member 234a (see FIG. 19A) fitted on the second stopper 234 to be movable in a length direction, a length direction extension 234b of the first stopper 133 (see FIG. 19B), or a radial direction extension 234c of the first projection 231 to a predetermined thickness (see FIG. 19C).

Figure 20:
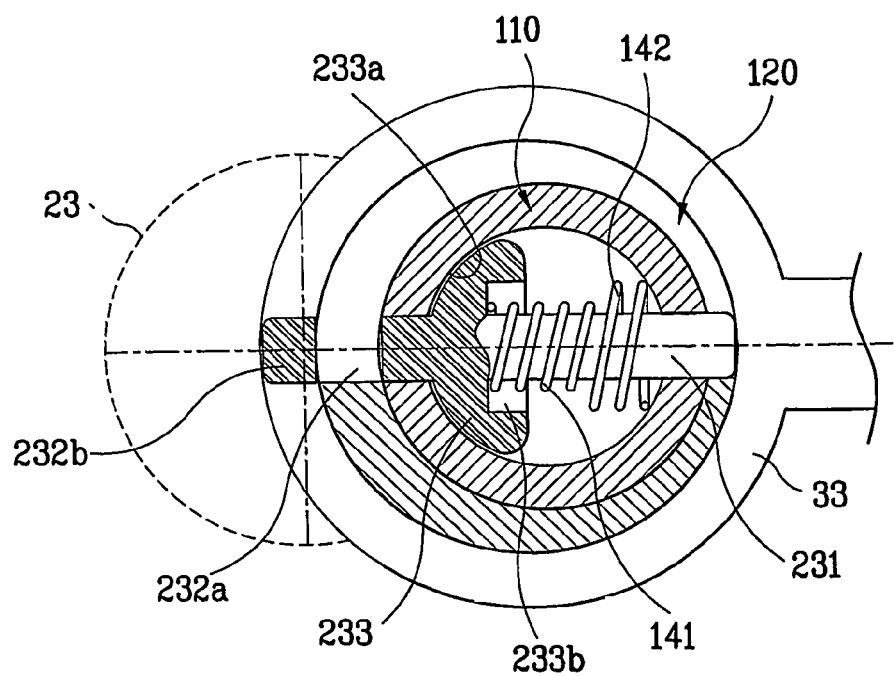
FIG. 20 illustrates a plan view of a variation of an elastic member applied to the second embodiment key member.

Moreover, referring to FIG. 20, instead of the second stopper 234, an elastic member 140 with a non-uniform elastic force may be applied to the second embodiment key member 230 the same as the first embodiment. As shown, the elastic member 140 has a first elastic member 141 with a predetermined elastic force, and a second elastic member 142 with an elastic force greater than the first elastic member 142. Actually, the first elastic member 141 is a spring with a predetermined diameter, and the second elastic member 142 is a spring with a diameter greater than the first elastic member having a greater spring constant and a greater elastic force. The second elastic member 141 has an elastic force greater than the greatest centrifugal force of the compressor for preventing the excessive movement of the key member 230, completely. The elastic member 140 limits movement of the key member 230 in the centrifugal force direction, for preventing the key member 230 from breaking away from, or failure in latching, the eccentric sleeve. Moreover, as additional components, such as the second stopper 234, can be dispensed with, a structure of the key member 130 is simplified, and the key member 130 can be fitted, easily.

Figure 21A:
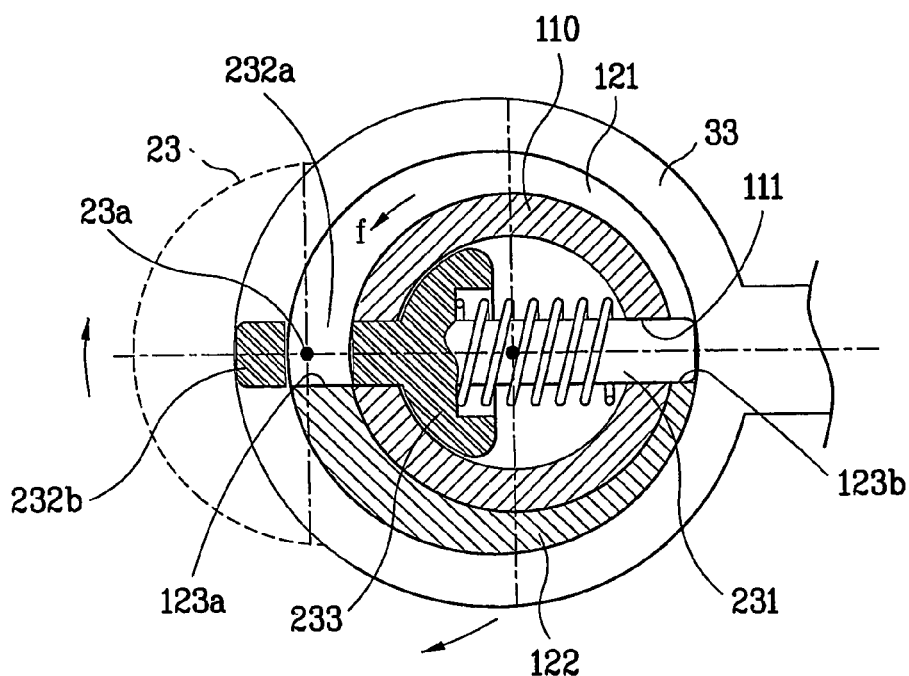
FIGS. 21A and 21B illustrate plan views each showing operation of a dual capacity compressor having the second embodiment key member applied thereto in a clockwise direction rotation.
Figure 21B:
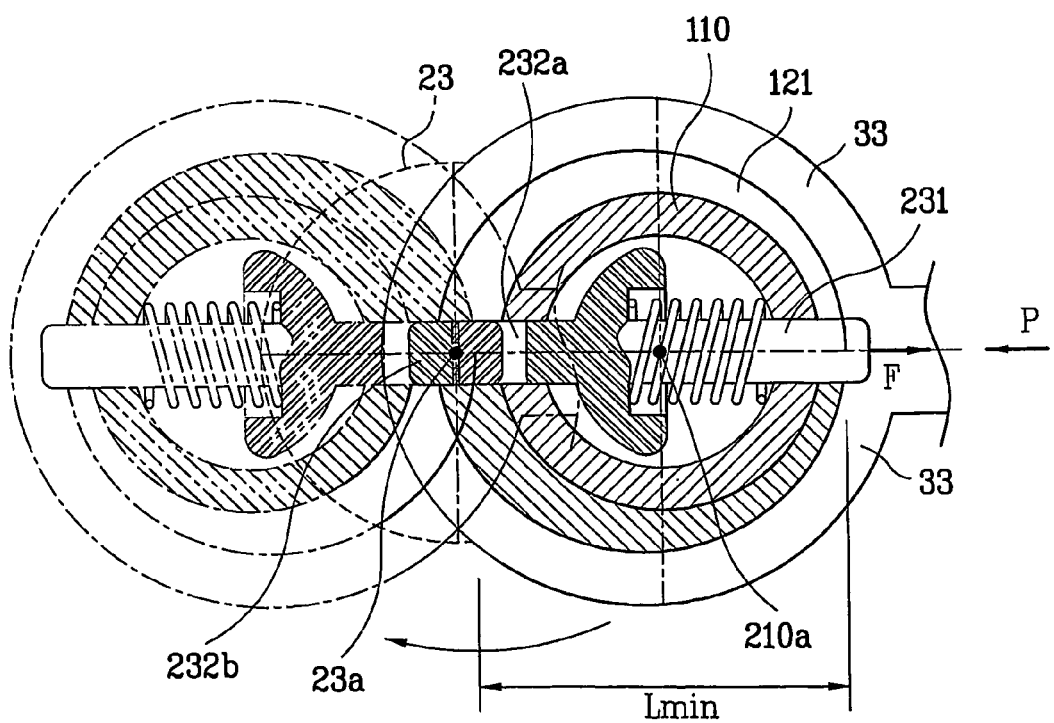
Figure 22A:
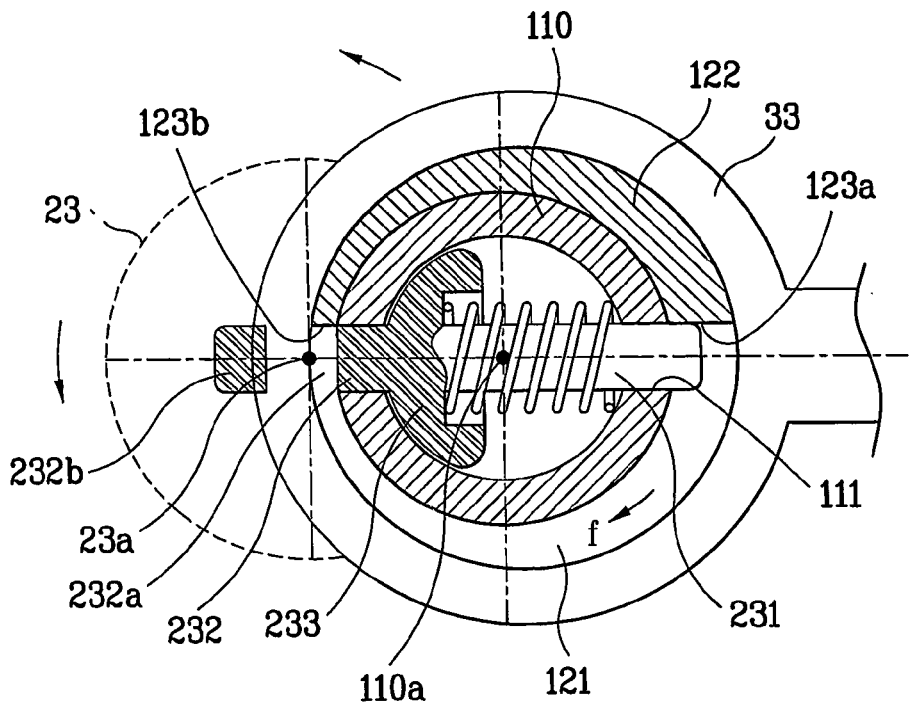
FIGS. 22A and 22B illustrate plan views each showing operation of a variation of a dual capacity compressor having the second embodiment key member applied thereto in a counter clockwise direction rotation.
Figure 22B:
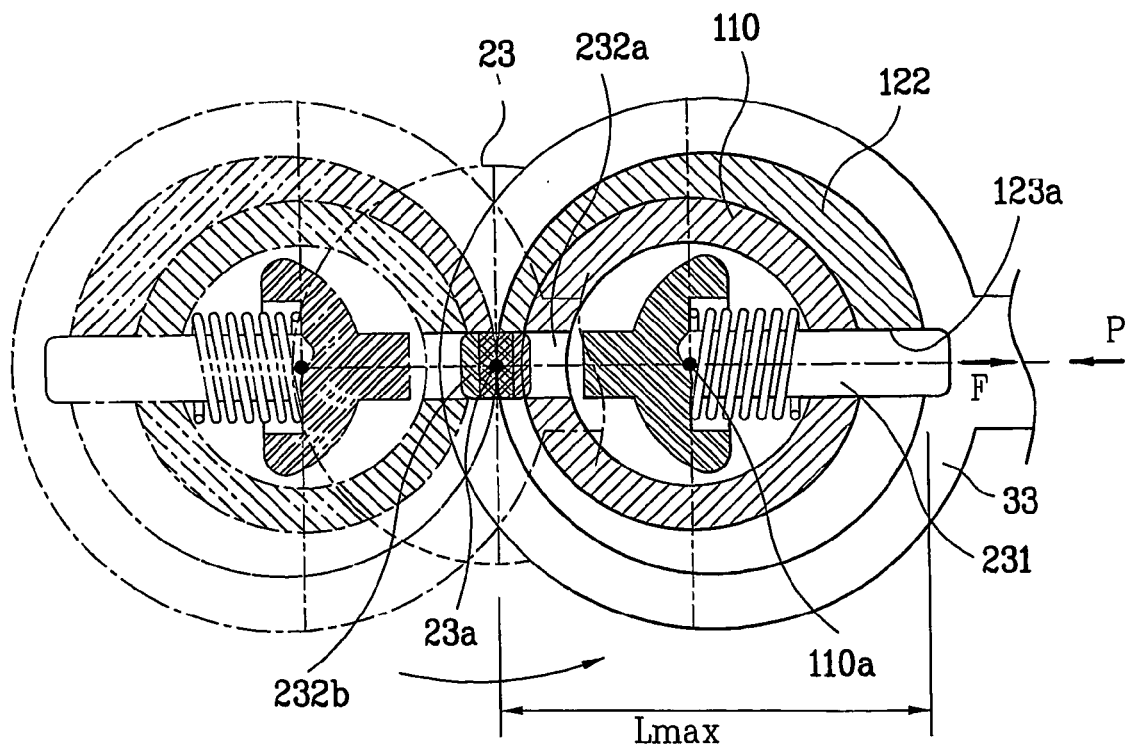

The operation of the dual capacity compressor having the second embodiment key member of the present invention will be described with reference to the attached drawings. FIGS. 21A and 21B illustrate plan views each showing operation of a dual capacity compressor of the present invention in a clockwise direction rotation, and FIGS. 22A and 22B illustrate plan views each showing operation of a dual capacity compressor of the present invention in a counter clockwise direction rotation.

Figure 23A:
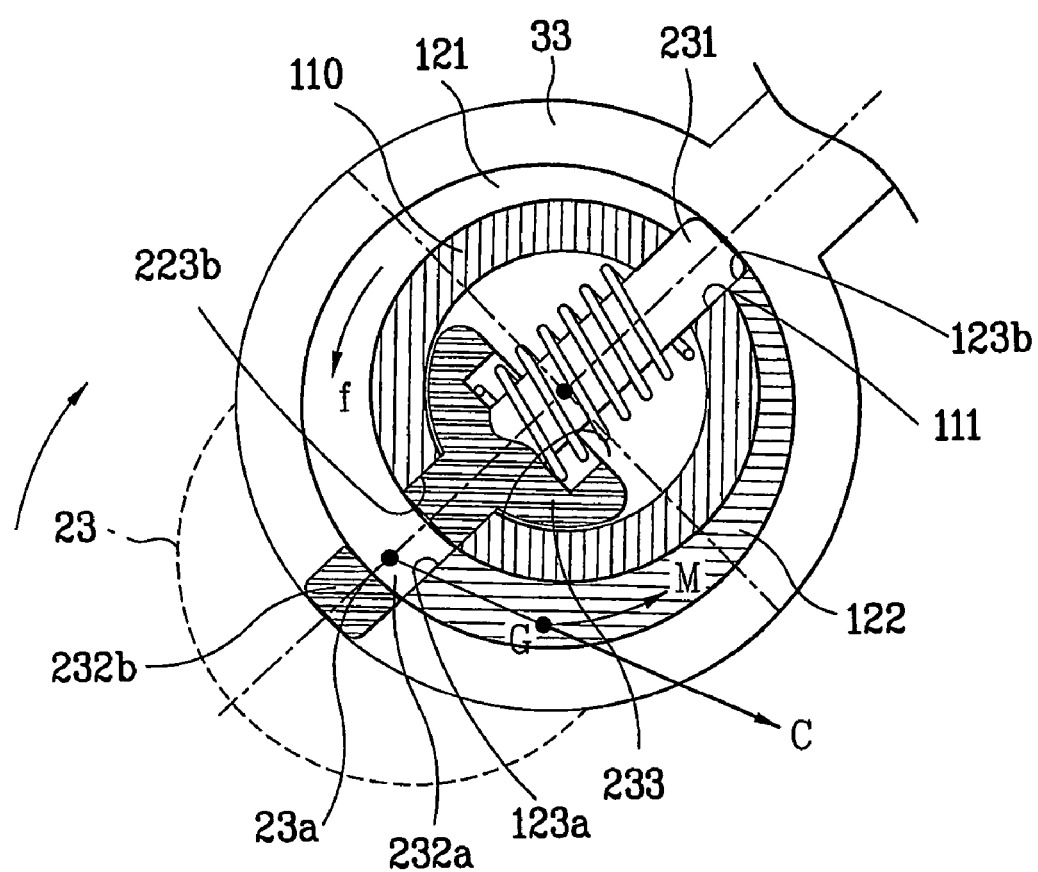
FIGS. 23A and 23B illustrate plan views each showing a relation of forces generated at an eccentric sleeve having the second embodiment key member applied thereto in a clockwise, and counter clockwise direction rotations.

FIG. 21A illustrates a relative position between the key member 130 and the eccentric sleeve 120 when the crank shaft starts to rotate in a regular direction, i.e., a clockwise direction. As described, the first projection 231 is always projected beyond the crank pin 110 by an elastic force in a direction inward of a radius of the crank pin 110. In a state the first projection 231 is projected, if the crank shaft 23 starts to rotate in the clockwise direction, the crank pin, the eccentric sleeve, and the key members 110, 120, and 130 start to revolve around the axis 23a of the crank shaft in the clockwise direction. During the revolution, there is a relative friction force 'f' between the crank pin 110 and the connecting rod 33 in a direction opposite to the rotation direction, i.e., the counter clockwise direction. According to this, the eccentric sleeve 120 starts to rotate around the crank pin 110a in the counter clockwise direction by the friction force 'f', until the eccentric sleeve 120, more specifically, the limiting part 122 passes through the channel 232a of the second projection, and the step 123b at the thin side is latched at the first projection 231. As shown in FIG. 23A, since the first projection 231 latches the eccentric sleeve 120 at a position on an radial direction outer side of the crank shaft relatively, a center of gravity 'G' of the eccentric sleeve 120 is positioned opposite to the center of gravity in FIG. 15A with respect to the line of action of the centrifugal force (perpendicular to, and along a plane containing, both the axes 23a, and 110a). Owing to the position of the center of gravity 'G', the centrifugal force 'C' generates a rotational moment 'M' opposite to the rotation direction (counter clockwise direction). Therefore, together with the friction force 'f' acting in the same direction, the rotational moment 'M' rotates the eccentric sleeve 120 in a direction opposite to the rotation direction, i.e., the counter clockwise direction, enabling a stable engagement between the first projection 231 and the step 123b. Thereafter, as shown in FIG. 21B, if the rotating angular speed reaches to a certain level, the key member 130 moves along a direction of action of the centrifugal force 'F', i.e., in the length direction of the key member along the plane containing both the axes 23a, and 110a by the centrifugal force 'F'. According to this, as described with reference to FIG. 16C, the end 232b of the second projection 132 is engaged with the step 223a at the thick side, and the first projection 131 also maintains a state of contact with the step 123b at the same time. As described before, since the stable engagement of the first projection 231 is maintained by the rotational moment 'M' in a direction opposite to the direction of rotation, the second projection 232 can latch the eccentric sleeve 120 smoothly. This multiple point simultaneous contact enables the key member 130 to be in full engagement with the eccentric sleeve 120. Therefore, in the regular direction rotation, even if an external force 'P' from re-expansion of the working fluid after the compression, and other forces are received through the connecting rod 33, relative rotation between the crank pin 210 and the eccentric sleeve 220 is prevented. Also, in a case a local rotational moment is generated at the eccentric sleeve 120, a relative rotation of the eccentric sleeve 120 with respect to the crank pin 110 can be prevented. Also, referring to FIG. 21B, a solid line part in the drawing illustrates a top dead center state, a dashed line part in the drawing illustrates a bottom dead center state, and the eccentric sleeve 220 is arranged so as to provide the greatest eccentricity, in the regular directional rotation. Accordingly, the piston reciprocates in the greatest stroke length Lmin, and the compressor of the present invention has a minimum compression capacity.

Figure 23B:
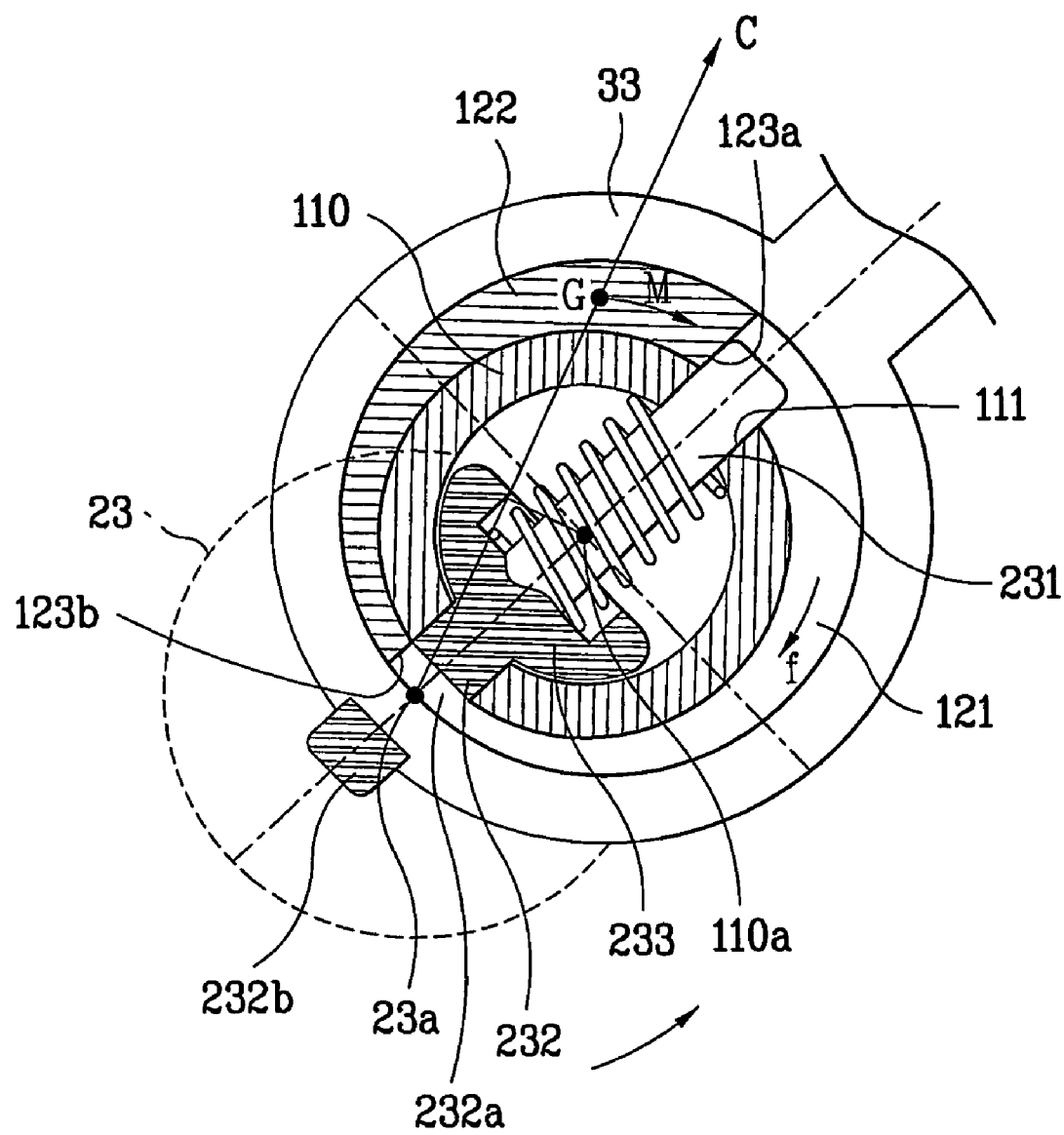
Figure 24:
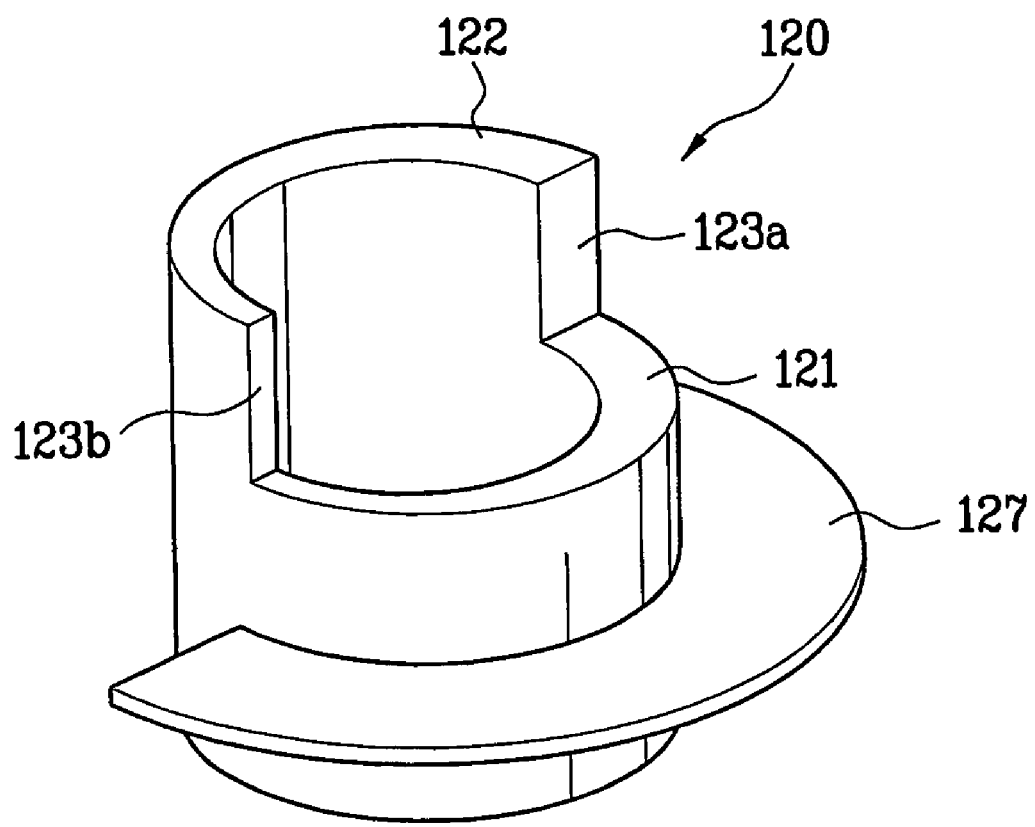
FIG. 24 illustrates a perspective view of a variation of an eccentric sleeve having a balance weight.

If the crank shaft 23 starts to rotate in a reverse, i.e., the counter clockwise direction, the relative friction force 'f' is generated between the crank pin 110 and the connecting rod 33 in an opposite direction of the rotation direction, i.e., in the clockwise direction. According to this, the eccentric sleeve 120 starts to rotate in the clockwise direction round the axis of the crank pin 110a through the channel 232a starting from a position shown in FIG. 21A until the step 123a at the thick side of the eccentric sleeve 120 is engaged with the first projection 131 projected to an outer side in the radial direction as shown in FIG. 22A. As shown in FIG. 23B, under the same reason with the clockwise rotation, the center of gravity 'G' of the eccentric sleeve is positioned opposite to the center of gravity in FIG. 15B with respect to the line of action of the centrifugal force. According to this, the centrifugal force 'C' generates a rotational moment 'M' in the clockwise direction, opposite to the rotation direction, to maintain a stable engagement between the first projection 231 and the step 123a, together with the friction force 'f' acting in a direction the same with the rotational moment 'M'. Alike the regular direction rotation, as shown in FIG. 22B, if a rotational angular speed reaches to a certain level, the second projection 232 is engaged with the step 123b at the thin side by the centrifugal force 'F', such that the multiple point contact state is made between the eccentric sleeve 120 and the key member 130.

Alike the case of the clockwise rotation, the stable engagement of the first projection 231 enables smooth engagement of the second projection 232 with the eccentric sleeve 120. Therefore, in the reverse direction rotation, even if the external force 'P' from the pressure the working fluid acts to the piston during the compression, and any other forces are received, the relative rotation between the crank pin 110 and the eccentric sleeve 120 can be prevented. Also, as shown in FIG. 22B, in a case of the reverse direction rotation, since the eccentric sleeve 120 is arranged to have a maximum eccentricity, the piston reciprocates in a maximum stroke length Lmax, such that the compressor of the present invention has a maximum compression capacity.

In conclusion, by eliminating the relative motion between the crank pin 110 and the eccentric sleeve 120 perfectly by using the key member 130, the compressor of the present invention can make stable operation. Moreover, the key member 230 prevents rotation of the eccentric sleeve by the centrifugal force 'C' and the rotational moment 'M', thereby permitting to secure an operational reliability.

On the other hand, for resolving the unstable engagement of the second projection 132 brought up with reference to FIGS. 15A and 15B before, the eccentric sleeve 120 may further include a balance weight 127 that shifts the center of gravity of the eccentric sleeve 120 for preventing disengagement of the key member 130 from the key member 130. As described before, since the center of gravity 'G' leans to the limiting part 122, the rotational moment 'M', with subsequent rotation, is generated before the key member 130 latches the eccentric sleeve 120, perfectly. For shifting a position of such a center of gravity 'G', it is required to increase a weight of a relatively light part of the eccentric sleeve 120. The balance weight has a substantial weight for shifting the center of gravity, and is provided to the track part 121 of the eccentric sleeve that is relatively light. The balance weight 127 can be formed as one unit with the eccentric sleeve, or attached to the eccentric sleeve 120 as a separate member.

Figure 25A:
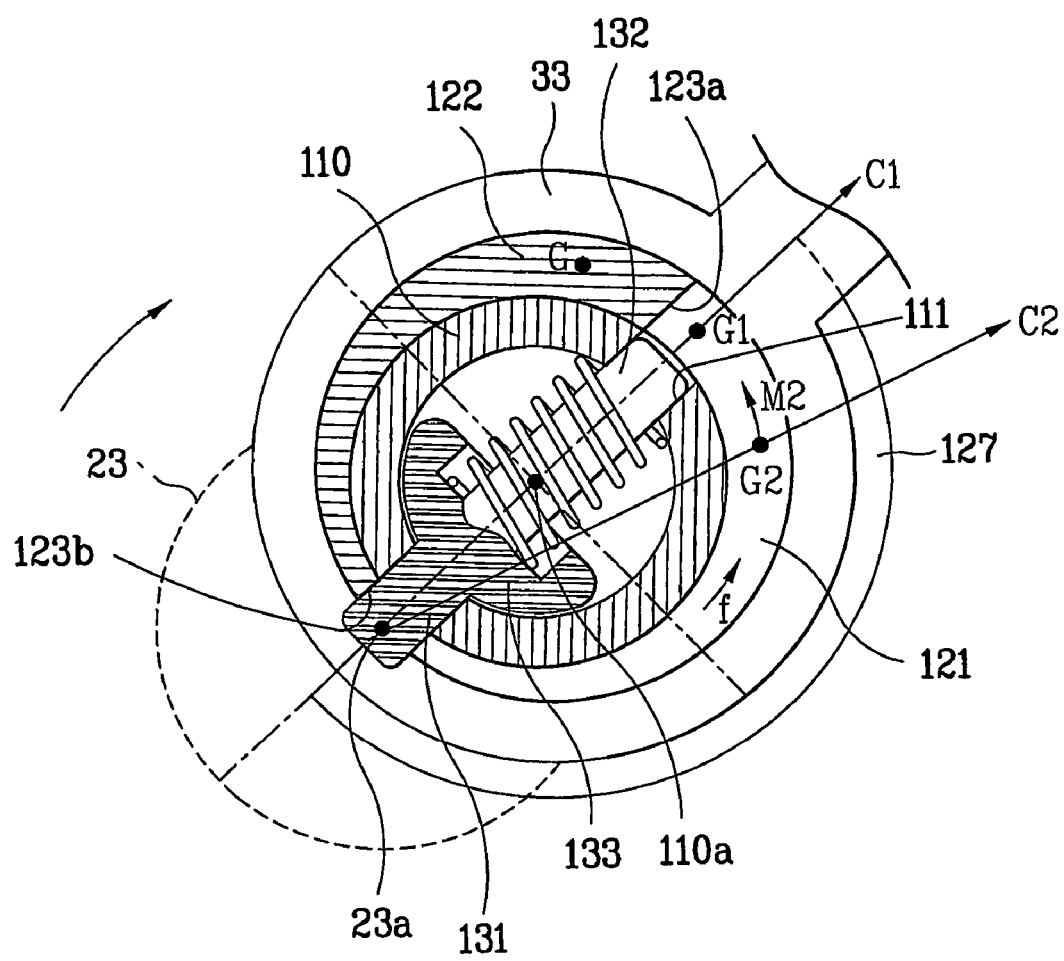
FIGS. 25A and 25B illustrate plan views each showing a relation of forces generated at an eccentric sleeve having a balance weight in clockwise and counter clockwise rotations.
Figure 25B:
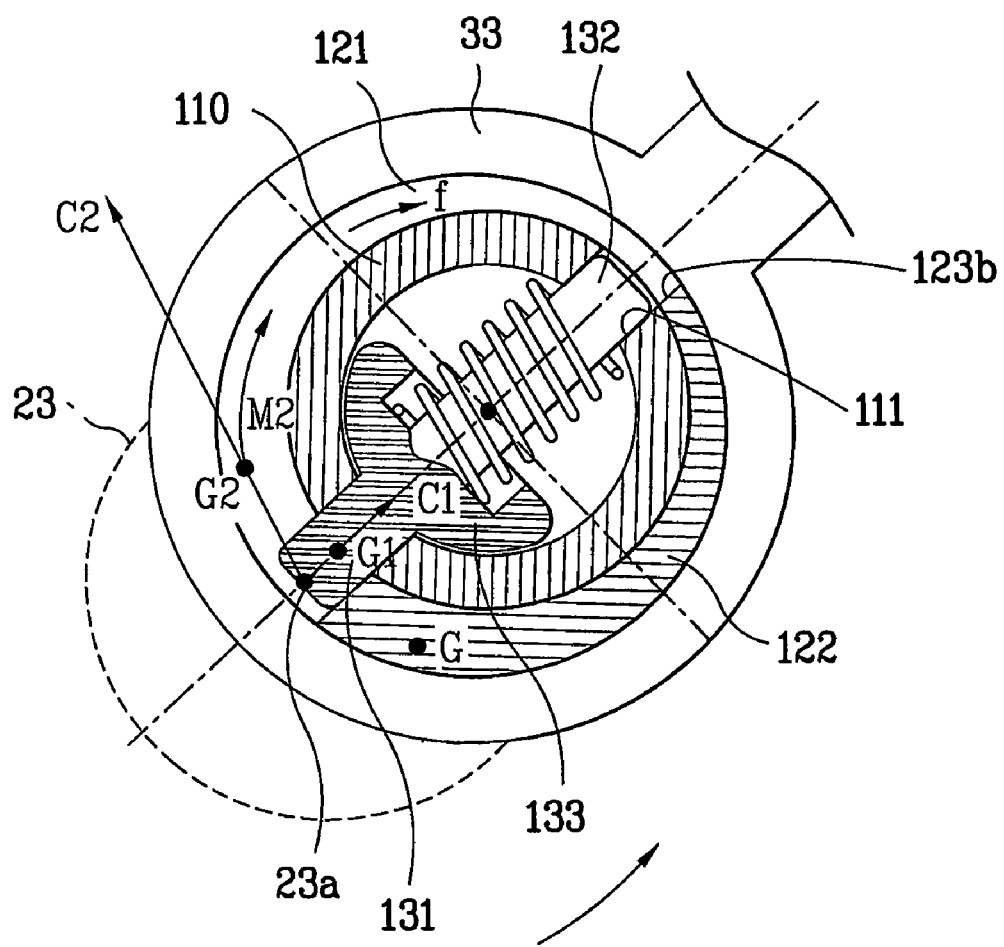

FIGS. 25A and 25B illustrate plan views each showing a relation of forces generated at an eccentric sleeve 120 having a balance weight 127 in clockwise and counter clockwise rotations.

As shown, preferably the balance weight 127 enables the eccentric sleeve 120 to have a center of gravity 'G1' shifted to position on a plane containing both the axis 23a of the crank shaft and the axis 110a of the crank pin. The center of gravity 'G1' enables the centrifugal force 'F' of the crank shaft 23/crank pin 110 and a centrifugal force C1 of the eccentric sleeve 120 to act on the same line of action. Accordingly, since there is no length of an arm between the center of gravity 'G1' and the axis 110a of the crank pin, no rotational moment is generated both in the clockwise direction rotation (FIG. 25A) and in the counter clockwise rotation (FIG. 25B), and since there is no rotational moment, the rotation is also prevented, basically.

Moreover, the balance weight 127 enables the eccentric sleeve 120 to have a center of gravity 'G2' shifted from the initial center of gravity 'G' to a position opposite with respect to the plane containing both the axis 23a of the crank shaft and the axis 110a of the crank pin. Such a center of gravity 'G2' generates a rotational moment 'M2' in a direction opposite to the rotation direction of the centrifugal force 'C2'. That is, as shown in FIG. 25A, the center of gravity 'G2' generates a rotational moment 'M2' in a counter clockwise direction in clockwise rotation, and as shown in FIG. 25B, the center of gravity 'G2' generates a rotational moment 'M2' in a clockwise direction in counter clockwise rotation. Together with the friction force 'f', the rotational moment 'M2' acts that the eccentric sleeve 120 rotates in a direction opposite to the rotation direction. Therefore, the first projection 131 engages with the eccentric sleeve 120 stably, to enable that the second projection 132 engages with the eccentric sleeve 120 smoothly in succession.

In conclusion, similar to the key member 230 in the second embodiment, the balance weight 127 prevents disengagement of the eccentric sleeve 120 from the key member 130 due to the centrifugal force 'C'/rotational moment 'M', leading to improve a reliability of the compressor of the present invention. Though the balance weight 127 is described in combination with the first embodiment key member 130, the balance weight 127 can be used together with the second embodiment key member 230.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The multiple point contact between the eccentric sleeve and the key member during operation permits that the key member can latch the crank pin with the eccentric sleeve, perfectly. According to this, the relative motion between the eccentric sleeve and the crank pin is prevented despite of any external, or internal cause, to permit stable operation of the compressor without variation of an output. That is, since a constant eccentricity is maintained, a constant compression is obtained. Moreover, a friction loss between the crank pin and the eccentric sleeve coming from the relative rotation is prevented. At the end, such a stable operation brings about an increase of an efficiency of the dual capacity compressor. In addition to this, noise occurred at the time of the relative rotation is prevented, and lifetimes of the components can be increased.

Moreover, parts, caught initially between the key member and the eccentric sleeve, are changed, or the center of gravity of the eccentric sleeve is shifted by using the balance weight. According to this, the eccentric sleeve is not rotated by the centrifugal force and the rotational moment even before the eccentric sleeve is latch by the key member perfectly. Therefore, the key member can latch the eccentric sleeve, perfectly, and stably, to improve the reliability of the compressor.

By using an elastic member that restricts movement of the key member caused by the centrifugal force appropriately, the compressor of the present invention can dispense with extra components required for serving the same function. According to this, a structure of the present invention becomes simple actually, and assembly becomes easy, to improve a productivity.

What is claimed is:

1. A dual capacity compressor, comprising: a power generating part including a reversible motor and a crank shaft inserted in the motor;
   a compression part including a cylinder, a piston positioned in the cylinder, and a connecting rod connected to the piston;
   a crank pin provided at an upper part of the crank shaft, eccentric from an axis of the crank shaft;
   an eccentric sleeve having an inner circumferential surface that is rotatably fitted within an outer circumferential surface of the crank pin, and an outer circumferential surface that is rotatably fitted to an end of the connecting rod; and a key member engaged with a portion of the eccentric sleeve so as to couple the eccentric sleeve and the crank pin in all rotation directions of the motor and provide for a plurality of compression capacities based on an effective amount of eccentricity and a piston displacement following a change in direction of rotation of the motor, and to prevent relative motion between the crank pin and the eccentric sleeve during operation regardless of the direction of rotation of the motor, wherein the eccentric sleeve includes a balance weight that rotates with the eccentric sleeve so as to shift a center of gravity of the eccentric sleeve during rotation and maintain the engagement between the key member and the eccentric sleeve.

2. The dual capacity compressor as claimed in claim 1, wherein the key member engages the eccentric sleeve at a plurality of points.

3. The dual capacity compressor as claimed in claim 1, wherein the key member engages the eccentric sleeve at two points aligned relative to a center line in any direction during operation.

4. The dual capacity compressor as claimed in claim 1, wherein a length of the key member is greater than an outside diameter of the crank pin.

5. The dual capacity compressor as claimed in claim 1, wherein the key member is continuously engaged with at least a part of the eccentric sleeve positioned in a radial direction at an inner portion of the crank shaft.

6. The dual capacity compressor as claimed in claim 1, wherein the key member includes:

a first projection that projects through the crank pin to an outer side of the crank pin by a first predetermined length; and a second projection that projects through the crank pin to an outer side of the crank pin by a second predetermined length only during operation.

7. The dual capacity compressor as claimed in claim 6, wherein the first projection projects continuously in a radial direction through the crank pin.

8. The dual capacity compressor as claimed in claim 1, wherein the key member prevents rotation of the eccentric sleeve due to a centrifugal force applied thereto, and a corresponding rotational moment.

9. The dual capacity compressor as claimed in claim 1, wherein the key member is continuously engaged with at least a part of the eccentric sleeve so that a rotational moment is generated at the eccentric sleeve in a direction opposite to the rotation direction of the crank shaft.

10. The dual capacity compressor as claimed in claim 1, wherein the key member is continuously engaged with at least a part of the eccentric sleeve positioned in a radial direction at an outer portion of the crank shaft.

11. The dual capacity compressor as claimed in claim 1, wherein the key member includes:

a first projection that projects through the crank pin to an outer side of the crank pin; and a second projection that projects through the crank pin to an outer side of the crank pin and is engaged with the eccentric sleeve during operation of the compressor.

12. The dual capacity compressor as claimed in claim 11, wherein the first projection projects in a radial direction to the outer side of the crank shaft.

13. The dual capacity compressor as claimed in claim 11, wherein the second projection projects through the crank pin such that the second projection does not interfere with the eccentric sleeve when the compressor is stationary.

14. The dual capacity compressor as claimed in claim 11, wherein the second projection includes a channel for passing the eccentric sleeve when the compressor is stationary.

15. The dual capacity compressor as claimed in claim 1, wherein the key member includes a stopper positioned in the crank pin so as to limit movement of the key member relative to the crank pin.

16. The dual capacity compressor as claimed in claim 15, wherein a contact surface of the stopper conforms to a corresponding inner circumferential surface of the crank pin.

17. The dual capacity compressor as claimed in claim 15, wherein the stopper comprises a first stopper that limits movement of the key member in a first direction.

18. The dual capacity compressor as claimed in claim 17, wherein the stopper further comprises a second stopper that limits movement of the key member in a second direction that is opposite the first direction.

19. The dual capacity compressor as claimed in claim 15, wherein the key member further comprises an elastic member that supports continuous projection of at least a part of the key member through the crank pin regardless of a state of operation of the compressor.

20. The dual capacity compressor as claimed in claim 19, wherein the elastic member limits movement of the key member in a first direction.

21. The dual capacity compressor as claimed in claim 19, wherein the elastic member provides a non-uniform elastic force.

22. The dual capacity compressor as claimed in claim 19, wherein an elastic force of a first part of the elastic member is greater than an elastic force of a second part of the elastic member.

23. The dual capacity compressor as claimed in claim 19, wherein a part of the elastic member has an elastic force that is greater than a centrifugal force generated by the key member.

24. The dual capacity compressor as claimed in claim 19, wherein the elastic member includes:

a first elastic member that contacts the key member; and a second elastic member positioned between the first elastic member and an inner circumferential surface of the crank pin, wherein an elastic force of the second elastic member is greater than that of the first elastic member.

25. The dual capacity compressor as claimed in claim 24, wherein the elastic force of the second elastic member is greater than a centrifugal force generated by the key member.

26. The dual capacity compressor as claimed in claim 24, wherein the first elastic member is a spring having a first diameter, and the second elastic member is a spring that extends from the first elastic member and that has a second diameter that is greater than the first diameter.

27. The dual capacity compressor as claimed in claim 1, wherein the crank pin includes a pair of key member fitting parts provided opposite to each other.

28. The dual capacity compressor as claimed in claim 27, wherein the key member fitting parts comprise through holes formed in a wall of the crank pin.

29. The dual capacity compressor as claimed in claim 27, wherein the key member fitting parts include at least one slot that extends from a top end of a wall of the crank pin to a predetermined position in the wall.

30. The dual capacity compressor as claimed in claim 1, wherein the eccentric sleeve includes:

a track part formed along a direction of a body thereof so as to allow rotation of a projection of the key member that projects through the crank pin; and a limiting part provided with the track part to limit rotation of the projection of the key member.

31. The dual capacity compressor as claimed in claim 30, wherein the track part of the eccentric sleeve comprises a cut away part that extends from a top end of the eccentric sleeve to a predetermined depth, and along a circumferential direction of the eccentric sleeve.

32. The dual capacity compressor as claimed in claim 30, further comprising steps provided between the track part and the limiting part, wherein the steps are parallel to a plane containing both a longitudinal axis of the crank shaft and a longitudinal axis of the crank pin.

33. The dual capacity compressor as claimed in claim 30, further comprising steps provided between the track part and the limiting part, wherein the steps are spaced apart from a plane containing both a longitudinal axis of the crank shaft and a longitudinal axis of the crank pin by a half of a thickness of the key member.

34. The dual capacity compressor as claimed in claim 30, further comprising steps provided between the track part and the limiting part, wherein at least one of the steps is sloped at an angle from a plane containing both a longitudinal axis of the crank shaft and a longitudinal axis of the crank pin by a half of a thickness of the key member.

35. The dual capacity compressor as claimed in claim 1, wherein the eccentric sleeve includes a ring member provided between a bottom surface of the eccentric sleeve and a top surface of the crank shaft.

36. The dual capacity compressor as claimed in claim 1, wherein the balance weight prevents rotation of the eccentric sleeve due to a rotational moment.

37. The dual capacity compressor as claimed in claim 1, wherein the balance weight prevents a rotational moment from being generated at the eccentric sleeve.

38. The dual capacity compressor as claimed in claim 1, wherein the balance weight positions a center of gravity of the eccentric sleeve on a plane containing both a longitudinal axis of the crank shaft and a longitudinal axis of the crank pin.

39. The dual capacity compressor as claimed in claim 1, wherein the balance weight generates a rotational moment in a direction that is opposite to a rotation direction.

40. The dual capacity compressor as claimed in claim 1, wherein the balance weight shifts a center of gravity of the eccentric sleeve to an opposite position with respect to a plane containing both a longitudinal axis of the crank shaft and a longitudinal axis of the crank pin.

41. The dual capacity compressor as claimed in claim 1, wherein the balance weight is provided with a part of the eccentric sleeve having a relatively light weight.

42. The dual capacity compressor as claimed in claim 1, wherein the balance weight is provided with a track part of the eccentric sleeve.

* * * * *

UNITED STATES PATENT AND TRADEMARK OFFICE
CERTIFICATE OF CORRECTION

PATENT NO. : 7,568,895 B2 Page 1 of 1
APPLICATION NO. : 10/568621
DATED : August 4, 2009
INVENTOR(S) : Jong Bong Kim et al.

It is certified that error appears in the above-identified patent and that said Letters Patent is hereby corrected as shown below:

Title page, item (87) should read:

(87)   PCT Pub. No.: WO05/061895

PCT Pub. Date: July 7, 2005

Signed and Sealed this

Sixteenth Day of February, 2010

David J. Kappos
*Director of the United States Patent and Trademark Office*